US011807011B2

(12) United States Patent
Suzuki

(10) Patent No.: US 11,807,011 B2
(45) Date of Patent: Nov. 7, 2023

(54) INFORMATION PROCESSING SYSTEM, INFORMATION PROCESSING METHOD, AND LEARNING DEVICE

(71) Applicant: Seiko Epson Corporation, Tokyo (JP)

(72) Inventor: Kazunaga Suzuki, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 63 days.

(21) Appl. No.: 17/475,770

(22) Filed: Sep. 15, 2021

(65) Prior Publication Data

US 2022/0080736 A1 Mar. 17, 2022

(30) Foreign Application Priority Data

Sep. 17, 2020 (JP) ................. 2020-156180

(51) Int. Cl.
| | |
|---|---|
| *G06N 20/00* | (2019.01) |
| *B41J 2/165* | (2006.01) |
| *B41J 2/045* | (2006.01) |
| *B41J 2/175* | (2006.01) |

(52) U.S. Cl.
CPC ......... *B41J 2/16579* (2013.01); *B41J 2/0451* (2013.01); *B41J 2/17566* (2013.01); *G06N 20/00* (2019.01); *B41J 2002/16582* (2013.01); *B41J 2002/17573* (2013.01); *B41J 2002/17589* (2013.01)

(58) Field of Classification Search
CPC ...... B41J 2/16579; B41J 29/393; G06N 20/00
See application file for complete search history.

(56) References Cited

U.S. PATENT DOCUMENTS

| | | | | |
|---|---|---|---|---|
| 2020/0080733 A1* | 3/2020 | Kato | ..................... | F24F 13/222 |
| 2020/0361210 A1* | 11/2020 | Sato | ....................... | G06N 3/045 |

FOREIGN PATENT DOCUMENTS

| | | |
|---|---|---|
| CN | 111562890 | 8/2020 |
| JP | 2013-078858 | 5/2013 |
| JP | 2018-136736 | 8/2018 |
| TW | I282309 B * | 6/2007 |

* cited by examiner

*Primary Examiner* — Sharon Polk
(74) *Attorney, Agent, or Firm* — WORKMAN NYDEGGER

(57) ABSTRACT

An information processing system includes a storage portion, a reception portion, and a processing portion. The storage portion stores a learned model obtained by performing machine learning on a replacement condition of a print head based on a data set in which nozzle surface image information obtained by photographing a nozzle surface of the print head and replacement necessity information representing replacement necessity of the print head or a replacement timing of the print head are associated with each other. The reception portion receives the nozzle surface image information. The processing portion outputs the replacement necessity information of the print head based on the received nozzle surface image information and the learned model.

15 Claims, 17 Drawing Sheets

FIG. 17

| | | | | |
|---|---|---|---|---|
| MAINTENANCE HISTORY INFORMATION | REPLACEMENT HISTORY INFORMATION OF PRINT HEAD | DATE ON WHICH REPLACEMENT IS PERFORMED | | |
| | | REPLACEMENT INTERVAL | | |
| | | ... | | |
| | WIPING HISTORY INFORMATION OF NOZZLE SURFACE OF PRINT HEAD | NUMBER OF TIMES THAT WIPING IS PERFORMED | | |
| | | WIPING STRENGTH | SET LOAD | |
| | | | SET SPEED | |
| | | MATERIAL OF WIPER | RUBBER/ELASTOMER | |
| | | | CLOTH | |
| | | ... | | |
| | RECOVERY CLEANING HISTORY INFORMATION | EXECUTION INTERVAL OF RECOVERY CLEANING | | |
| | | ENVIRONMENTAL CONDITION WHEN RECOVERY CLEANING IS PERFORMED | TEMPERATURE | |
| | | | HUMIDITY | |
| | | ... | | |
| INK INFORMATION | INK COMPOSITION INFORMATION | BLACK INK | | |
| | | WHITE INK | | |
| | | ... | | |
| | INK VISCOSITY INFORMATION | | | |

INFORMATION PROCESSING SYSTEM, INFORMATION PROCESSING METHOD, AND LEARNING DEVICE

The present application is based on, and claims priority from JP Application Serial Number 2020-156180, filed Sep. 17, 2020, the disclosure of which is hereby incorporated by reference herein in its entirety.

BACKGROUND

1. Technical Field

The present disclosure relates to an information processing system, an information processing method, and a learning device.

2. Related Art

Due to the deterioration of a surface state of a nozzle plate of a print head mounted on a printing device, periodical maintenance or replacement is necessary for the print head. JP-A-2018-136736 discloses a method for predicting a part replacement time or an optimum maintenance method of the print head or the like based on the number of passes.

However, it is difficult to predict the part replacement time or the optimum maintenance method of the print head or the like with sufficient accuracy even when determination is performed based on individual information. JP-A-2018-136736 does not disclose a method for making comprehensive determination based on various factors.

SUMMARY

According to an aspect of the present disclosure, there is provided an information processing system including a storage portion that stores a learned model that is obtained by performing machine learning on a replacement condition for a print head based on a data set in which nozzle surface image information obtained by photographing a nozzle surface of the print head and replacement necessity information representing replacement necessity of the print head or a replacement timing of the print head are associated with each other; a reception portion that receives the nozzle surface image information; and a processing portion that outputs the replacement necessity information of the print head based on the received nozzle surface image information and the learned model.

According to another aspect of the present disclosure, there is provided an information processing method including: storing a learned model that is obtained by performing machine learning on a replacement condition for a print head based on a data set in which nozzle surface image information obtained by photographing a nozzle surface of the print head and replacement necessity information representing replacement necessity of the print head or a replacement timing of the print head are associated with each other; receiving the nozzle surface image information; and outputting the replacement necessity information of the print head based on the received nozzle surface image information and the learned model.

According to still another aspect of the present disclosure, there is provided a learning device including a storage portion that stores a learned model that is obtained by performing machine learning on a replacement condition for a print head based on a data set in which nozzle surface image information obtained by photographing a nozzle surface of the print head and replacement necessity information representing replacement necessity of the print head or a replacement timing of the print head are associated with each other; an acquisition portion that acquires the nozzle surface image information; and a processing portion that outputs the replacement necessity information of the print head based on the acquired nozzle surface image information and the learned model.

BRIEF DESCRIPTION OF THE DRAWINGS

FIG. 17 is a diagram showing a modification example of the input and the output of the neural network.

DESCRIPTION OF EXEMPLARY EMBODIMENTS

Hereinafter, preferred embodiments of the present disclosure will be described in detail. The present embodiment described below does not unreasonably limit contents described in the claims, and not all of the configurations described in the present embodiment are limited as essential constituent requirements.

1. Method Of Present Embodiment

Figure 1:
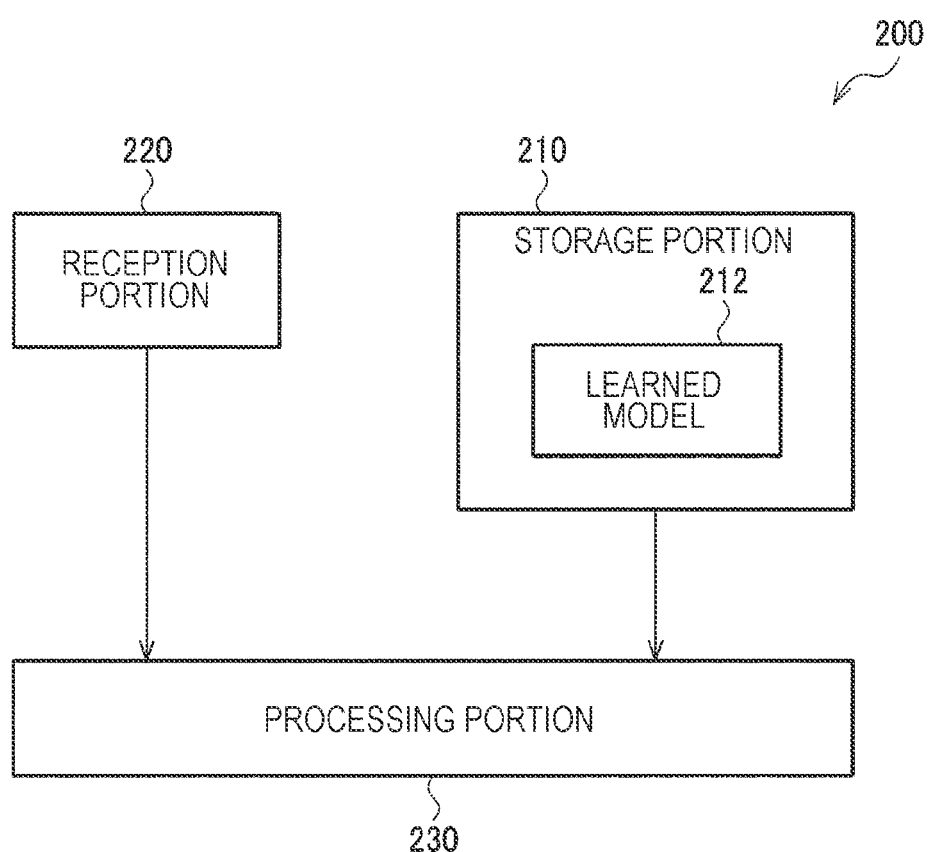
FIG. 1 is a block diagram showing a configuration example of an information processing system.

FIG. 1 is a block diagram showing a configuration example of an information processing system 200 of the present embodiment. The information processing system 200 of the present embodiment includes a storage portion 210, a reception portion 220, and a processing portion 230. In addition, the storage portion 210 stores a learned model 212. The learned model 212 is a program module that outputs information related to replacement of the print head 30 of the printing device 1 which will be described later in FIGS. 2 and 3, and is generated or updated when machine learning, which will be described later, is performed.

The print head 30 of the printing device 1 is expensive, and replacement earlier than an original usable time leads to an increase in cost. Therefore, it is desirable that, after accurately predicting the life of the print head 30 and using the print head 30 to the maximum extent, the print head 30 can be replaced before a problem occurs. JP-A-2018-136736 discloses a method for predicting a maintenance time and a replacement time of the print head 30 by sensing the number of passes of the print head 30 and the like. By doing so, for example, a surface of a nozzle plate NP, which will be described later, can be regularly cleaned, so that it is considered that a burden on the user can be reduced while maintaining print quality.

However, the replacement time of the print head 30 cannot be predicted with sufficient accuracy even when determination is performed based on individual sensing data. There are cases where a print abnormality occurs due to a factor that recovers by maintenance and the print abnormality occurs due to a factor that does not recover even when maintenance is performed. For example, when a liquid repellent film 338 on the surface of the nozzle plate NP, which will be described later in FIG. 4, deteriorates, there is a case where the print abnormality suddenly occurs even when the ink or the like is removed by maintenance. Therefore, it is necessary to appropriately determine the replacement time of the print head 30 based on various factors.

Therefore, the storage portion 210 of the information processing system 200 of the present embodiment stores the learned model 212 which is machine-learned based on a data set in which the nozzle surface image information NI that is captured image information of the surface of the nozzle plate NP and replacement condition for the print head 30 are associated with each other. The replacement condition for the print head 30 includes both replacement necessity of the print head 30 and a replacement timing of the print head. In addition, although details will be described later, the machine learning in the present embodiment is, for example, supervised learning. The training data in the supervised learning is a data set in which input data and a correct answer label are associated with each other. That is, the learned model 212 of the present embodiment is generated by the supervised learning based on a data set in which the input data consisting of various pieces of nozzle surface image information NI and the correct answer label consisting of various replacement conditions for the print head 30 are associated with each other. In the present embodiment, the learned model 212 is generated by a learning portion 420, which will be described later in FIGS. 7 to 9. In other words, the information processing system 200 of the present embodiment includes the storage portion 210 that stores the learned model 212 obtained by performing machine learning on the replacement condition for the print head based on a data set in which the nozzle surface image information NI obtained by photographing a nozzle surface of the print head and replacement necessity information representing replacement necessity of the print head or a replacement timing of the print head are associated with each other.

The reception portion 220 is, for example, a communication interface that receives input data constituting the training data from another device, but may be an interface for reading the input data from the storage portion 210. Specifically, the reception portion 220 receives the nozzle surface image information NI, which will be described later, as the input data. In other words, the information processing system 200 of the present embodiment includes a reception portion 220 that receives the nozzle surface image information NI.

The processing portion 230 performs an inference process which will be described later based on the input data received by the reception portion 220 based on the learned model 212, and outputs a result of the inference process. Specifically, the processing portion 230 outputs replacement necessity information of the print head 30 based on the nozzle surface image information NI received by the reception portion 220 and the learned model 212. In other words, the information processing system 200 of the present embodiment includes a processing portion 230 that outputs the replacement necessity information of the print head 30 based on the received nozzle surface image information NI and the learned model 212. The processing portion 230 of the present embodiment includes the following hardware. The hardware can include at least one of the circuit that processes the digital signal and the circuit that processes the analog signal. For example, the hardware can consist of one or more circuit devices mounted on a circuit substrate or one or more circuit elements. One or more circuit devices are, for example, ICs and the like. The one or more circuit elements are, for example, resistors, capacitors, and the like.

In addition, the processing portion 230 may be realized by the following processor. The processing portion 230 of the present embodiment includes a memory that stores information and a processor that operates based on the information stored in the memory. The memory is, for example, a storage portion 210. The information includes, for example, a program and various data. The processor includes the hardware. As the processor, various processors, such as a central processing unit (CPU), a graphics processing unit (GPU), and a digital signal processor (DSP), can be used. The memory may be a semiconductor memory such as a static random access memory (SRAM) or a dynamic random access memory (DRAM), may be a register, may be a magnetic storage device such as a hard disk device, and may be an optical storage device such as an optical disk device. For example, the memory stores commands that can be read by the computer, and, when the commands are executed by the processor, the functions of respective portions of the processing portion 230 are realized as processes. Here, the command may be a command of a command set constituting the program, or may be a command instructing an operation with respect to a hardware circuit of the processor.

As described above, the information processing system 200 of the present embodiment includes the storage portion 210, the reception portion 220, and the processing portion 230. In addition, the storage portion 210 stores the learned model 212 obtained by performing machine learning on the replacement condition for the print head based on the data set in which the nozzle surface image information NI obtained by photographing the nozzle surface of the print head and the replacement necessity information representing replacement necessity of the print head or a replacement timing of the print head are associated with each other. In addition, the reception portion 220 receives the nozzle surface image information NI. In addition, the processing portion 230 outputs the replacement necessity information of the print head 30 based on the received nozzle surface image information NI and the learned model 212. By providing such a configuration, when the reception portion 220 receives new nozzle surface image information NI, the processing portion 230 can perform the inference process based on the learned model 212 and output the replacement necessity information. As a result, appropriate information can be obtained for the replacement time, the replacement timing, and the like of the print head 30. Therefore, the man-hours and costs required for maintenance of the printing device 1 can be minimized, so that the maintenance cost can be reduced.

Figure 2:
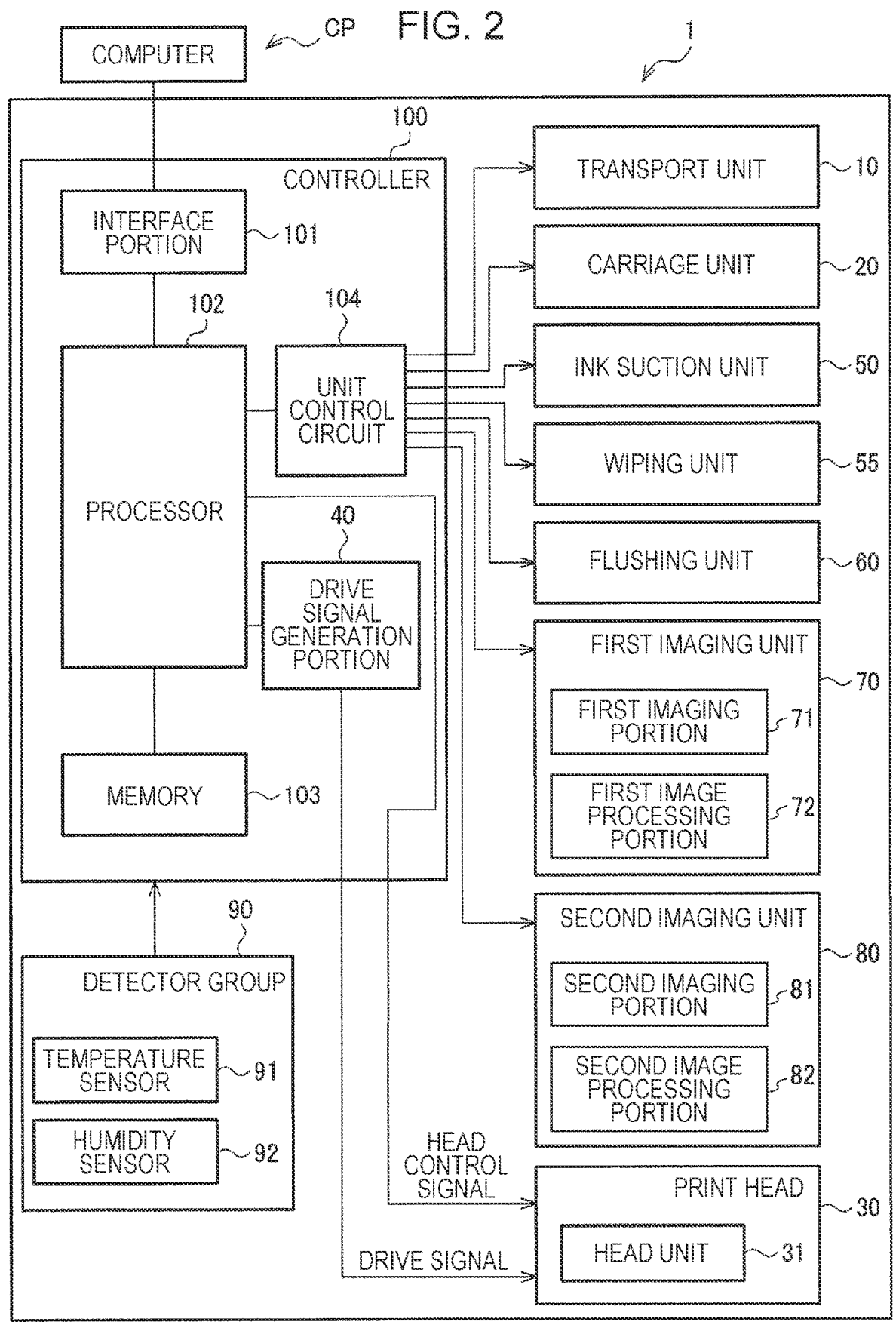
FIG. 2 is a block diagram showing a configuration example of a printing device.
Figure 3:
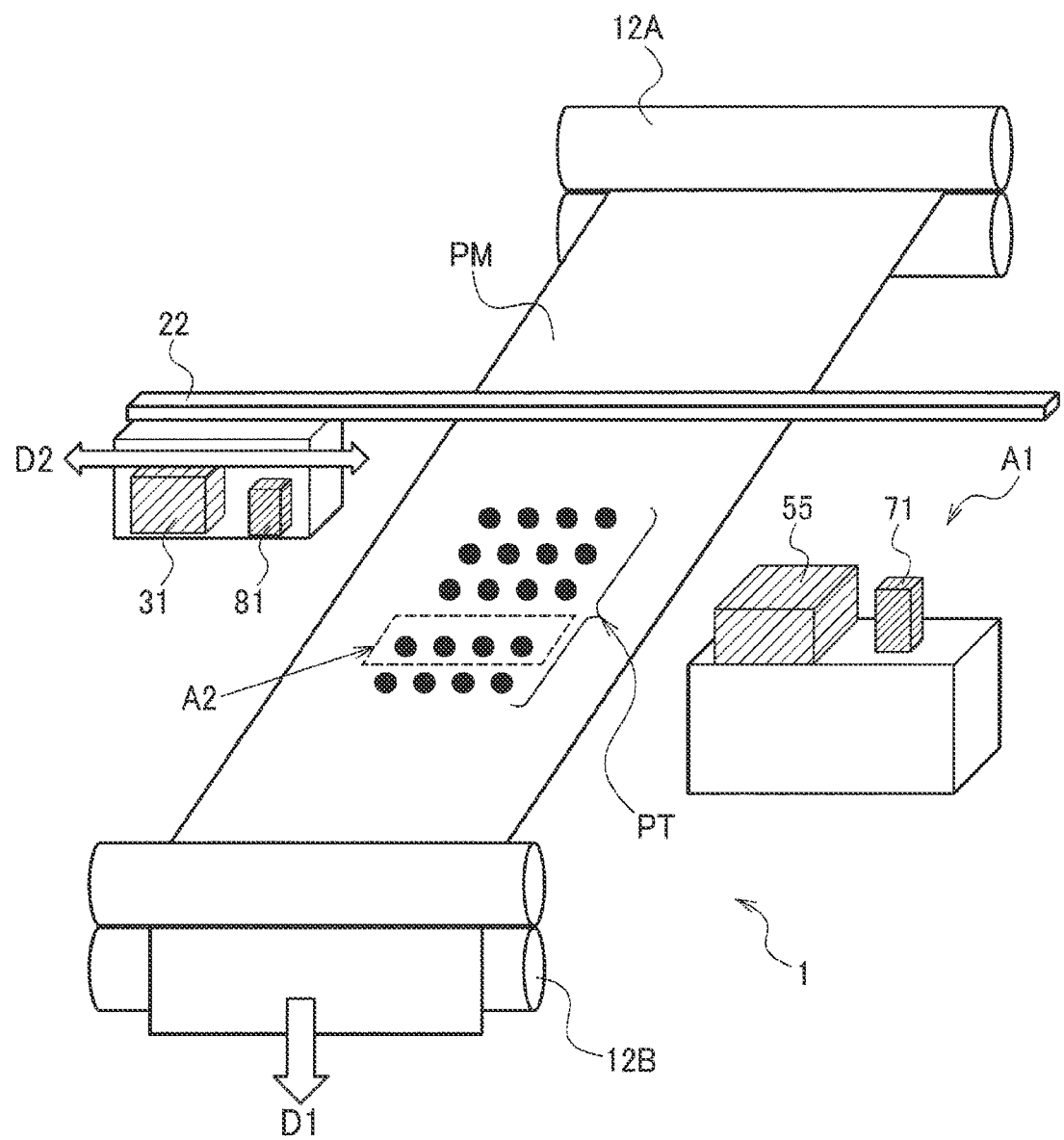
FIG. 3 is a diagram showing an example of a mechanical mechanism of the printing device.

Next, the details of the printing device 1, to which the information processing system 200 of the present embodiment is applied, will be described with reference to FIG. 2 and FIG. 3. FIG. 2 is a block diagram showing a configuration example of the printing device 1, and FIG. 3 is a diagram showing an example of a mechanical mechanism of the printing device 1. The details of some configurations of the print head 30 and the like will be described later with reference to FIG. 4 to FIG. 6. In addition, the correspondence relationship between the information processing system 200 and the printing device 1 will be described later with reference to FIG. 7 to FIG. 9.

As shown in FIG. 2, the printing device 1 includes a transport unit 10, a carriage unit 20, a print head 30, a drive signal generation portion 40, an ink suction unit 50, a wiping unit 55, a flushing unit 60, a first imaging unit 70, a second imaging unit 80, a detector group 90, and a controller 100. The printing device 1 discharges ink toward a print medium PM, and is communicably connected to a computer CP. The computer CP transmits print data corresponding to an image to the printing device 1 in order to cause the printing device 1 to print the image.

The print medium PM is transported in a predetermined direction by the transport unit 10. The print medium PM is, for example, cloth, but may be various media such as paper, film, and polyvinyl chloride (PVC). In addition, the paper here may be printing paper of a predetermined size or continuous paper. In the following description, a direction in which the print medium PM is transported is referred to as a transport direction. The transport direction corresponds to a direction D1 in FIG. 3. The transport unit 10 includes, for example, rollers 12A and 12B which are transport rollers 12 shown in FIG. 3, a transport motor (not shown), and the like. The number of rollers is not limited to two. In the following description, the rollers are simply referred to as the transport roller 12. The transport motor rotates the transport roller 12. The print medium PM is transported to a print area, which is an area where the printing process can be executed, by the rotation of the transport roller 12. The print area is an area that can face the print head 30.

The controller 100 is a control unit for controlling the printing device 1. The controller 100 includes an interface portion 101, a processor 102, a memory 103, and a unit control circuit 104. The interface portion 101 transmits and receives data between the computer CP, which is an external device, and the printing device 1. The processor 102 is an arithmetic processing unit for controlling the whole printing device 1. The processor 102 is, for example, a central processing unit (CPU). The memory 103 is used to secure an area, which stores the program of the processor 102, a work area, and the like. The processor 102 controls each unit using the unit control circuit 104 according to the program stored in the memory 103.

The print head 30 is mounted on the carriage unit 20. As shown in FIG. 3, for example, the carriage unit 20 includes a carriage 21 supported so as to be reciprocally movable along a direction D2 which is a width direction of the print medium PM along a guide rail 22, and a carriage motor (not shown). The carriage motor is driven based on a carriage control signal from a processor 102. The carriage 21 moves integrally with the print head 30 when the carriage motor is driven. The printing device 1 of the present embodiment is, for example, a printing device using a serial head method, as shown in FIG. 3. The serial head method is a method of printing by the width of the print medium PM by reciprocating the print head 30 in the direction D2. The direction D2 can also be referred to as a main scanning direction. The print head 30 includes a plurality of head units 31. Each head unit 31 includes, for example, a plurality of nozzles NZ disposed along the direction D1 and a head control portion (not shown). Hereinafter, a plurality of nozzles NZ disposed along the direction D1 will be referred to as a nozzle row. In addition, here, it is assumed that the intervals between the nozzles NZ are equal.

The drive signal generation portion 40 generates a drive signal. When the drive signal is applied to a piezo element PZT which is a drive element, the piezo element PZT expands and contracts, and ink is discharged from each of the nozzles NZ. Details of the head unit 31 including the piezo element PZT will be described later with reference to FIG. 3. The head control portion controls the discharge of ink from the nozzle NZ with respect to the print medium based on a head control signal from the processor 102 and the drive signal from the drive signal generation portion 40. As a result, an image is formed on the print medium PM.

The ink suction unit 50 sucks ink in the head from the nozzles NZ of the print head 30 and releases the ink to the outside of the head. The ink suction unit 50 operates a suction pump (not shown) in a state where a cap (not shown) is in close contact with a nozzle surface of the print head 30 so as to make a space of the cap be a negative pressure, thereby sucking the ink in the print head 30 together with air bubbles mixed in the print head 30. As a result, the discharge defect of the nozzle NZ can be recovered.

The wiping unit 55 removes the liquid droplet adhering to the nozzle plate NP of the print head 30. The wiping unit 55 can realize wiping by causing the wiper, which is made of an elastic member such as rubber or an elastomer, to come into contact with the nozzle plate NP of the print head 30. Specifically, for example, the carriage 21 is moved to a position shown in A1 of FIG. 3, that is, a retracted position retracted from an area through which the print medium PM passes, so that a tip portion of the wiper comes into contact with the nozzle plate NP of the print head 30 at the retracted position and is bent. As a result, the wiping unit 55 removes the liquid droplet adhering to the nozzle plate NP.

In addition, although not shown, the wiping unit 55 may be realized by disposing a roll-shaped wiper made of cloth or the like and a unit including a first winding shaft and a second winding shaft around which the wiper is wound at, for example, the retracted position shown in A1 of FIG. 3 as described above. The wiper wound around the first winding shaft is fed to the second winding shaft by a given feeding unit. When the wiper is pressed against the nozzle plate NP on the path, the liquid droplets adhering to the nozzle plate NP are removed. The wiping unit 55 may be used to remove a foreign matter, such as the paper dust, adhering to the nozzle plate NP. In that case, the ink can be normally discharged from the nozzle NZ which is clogged by the foreign matter.

The flushing unit 60 receives and stores the ink discharged when the print head 30 performs a flushing operation. The flushing operation is an operation of applying a drive signal, which is not related to an image to be printed, to the drive element, and causing ink droplets to be forcibly and continuously discharged from the nozzle NZ. As a result, it is possible to suppress an inappropriate amount of ink from being discharged because the ink in the head thickens and dries, so that the discharge defect of the nozzle NZ can be recovered.

The first imaging unit 70 images the surface of the nozzle plate NP. The first imaging unit 70 includes a first imaging portion 71 and a first image processing portion 72. For example, when the first imaging portion 71 is disposed, together with the wiping unit 55, at the retracted position shown in A1 described above and the carriage 21 is moved to the retracted position, the first imaging portion 71 faces the surface of the nozzle plate NP of the print head 30. Therefore, it is possible to realize that the first imaging unit 70 images the surface of the nozzle plate NP. Although the first image processing portion 72 and the controller 100 are described in FIG. 2, the first image processing portion 72 may be realized by the controller 100.

The first imaging portion 71 includes a light emitting portion (not shown). The light emitting portion may include a plurality of types of light sources. By doing so, the light sources can be changed, so that different objects on the surface of the nozzle plate NP can be independently emphasized and displayed. The different objects are, for example, remaining ink IR, the liquid repellent film 338, an intermediate film 337, and the like, which will be described later.

Although the details will be described later, the second imaging unit 80 inspects the discharge defect based on a state of a printed image formed on the print medium PM. Here, the printed image is, for example, a test pattern PT as schematically shown in FIG. 3. The second imaging unit 80 includes a second imaging portion 81 and a second image processing portion 82. For example, the second imaging unit 80 acquires discharge result image information by imaging a result in which the ink is discharged to the print medium PM. Although the second image processing portion 82 and the controller 100 are separately shown in FIG. 2, the second image processing portion 82 may be realized by the controller 100.

The test pattern PT is, for example, as shown in FIG. 3, a pattern in which a dot pattern discharged from each of the nozzles NZ of the nozzle row is formed in a plurality of rows along the direction D2, but may be a ruled line pattern. The test pattern PT in FIG. 3 is an example for schematic explanation, and the number of nozzles NZ is not limited to five, and the number of dot pattern rows is not limited to four. As described above, since the nozzles NZ of each nozzle row are at even intervals, the intervals of the respective dots in the direction D1 of the test pattern PT are equal when states of the nozzles NZ are normal. However, when the discharge abnormality occurs at a certain nozzle NZ, for example, positions of the dots discharged from the NZ deviate, so that the test pattern PT in which the intervals of the dots are disturbed is printed as shown in A2. A reason why the discharge abnormality occurs will be described later. Since the test pattern PT includes information of the discharge position deviation, it may also be referred to as discharge result information, and the details will be described later.

In addition, the second imaging unit 80 is mounted on the carriage 21. By doing so, even when an angle of view of the second imaging portion 81 is narrower than the width of the print medium PM, it is possible to image a print result in a wide range and the test pattern PT is imaged in real time, so that adjustment time can be shortened and the second imaging portion 81 can efficiently perform imaging.

The detector group 90 monitors an operating situation of the printing device 1, and includes, for example, a temperature sensor 91 and a humidity sensor 92. The detector group 90 may include a sensor (not shown) such as a barometric pressure sensor, an altitude sensor, an air bubble sensor, a dust sensor, and a rubbing sensor. In addition, the detector group 90 may include a configuration such as a rotary type encoder used to control the transport of the print medium PM, a paper detection sensor that detects the presence or absence of the print medium PM to be transported, and a linear encoder that detects a position of the carriage 21 in a movement direction.

Hereinabove, the printing device 1 using the serial head method is described above. However, the printing device 1 of the present embodiment may be a printing device using a line head method in which the print head 30 is provided to cover the paper width.

Figure 4:
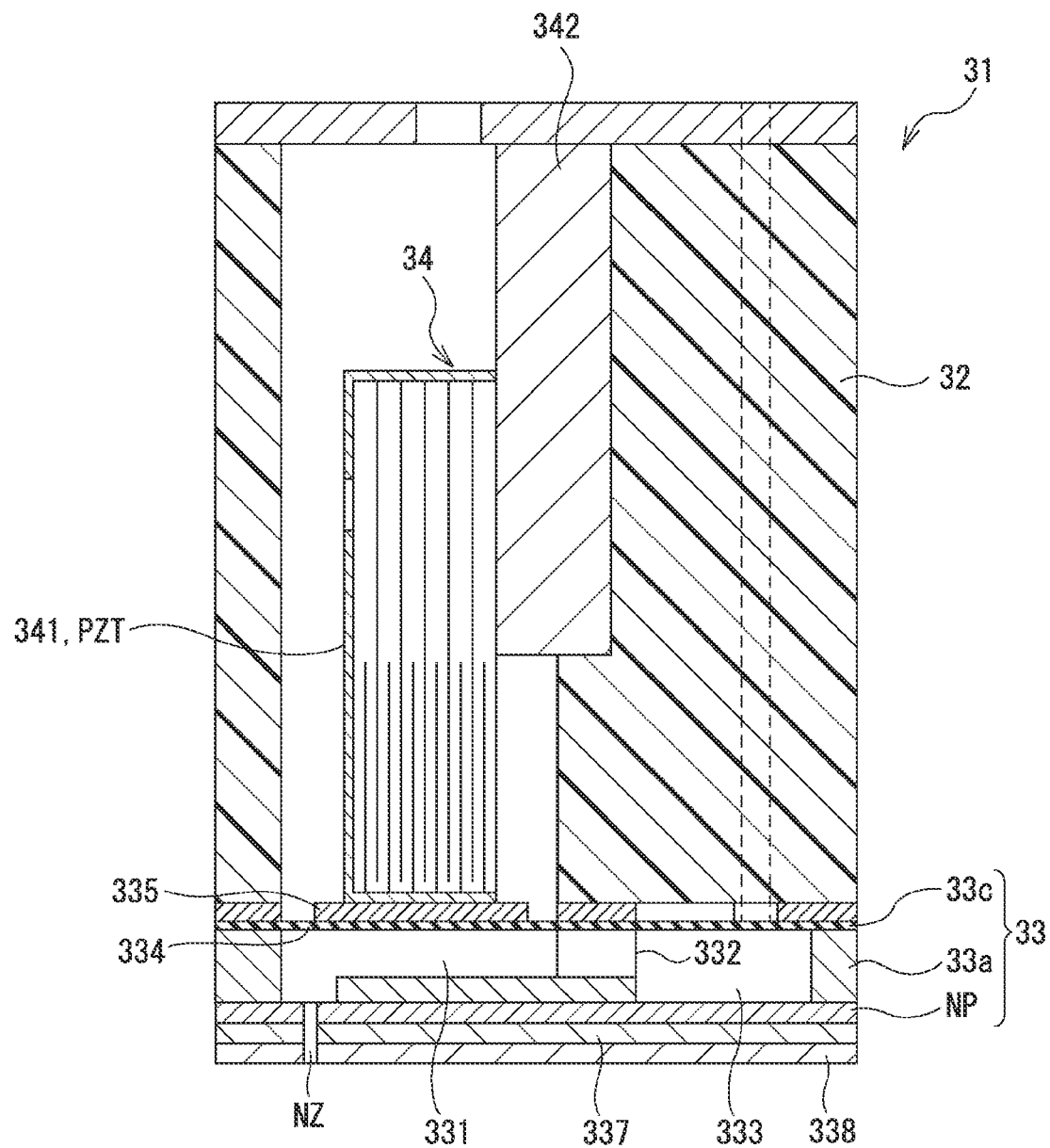
FIG. 4 is a diagram showing a configuration example of a print head.

Next, a configuration example of the print head 30 will be described in detail with reference to FIG. 4. FIG. 4 is a cross-sectional diagram showing a configuration of the head unit 31 included in the print head 30. The head unit 31 includes a case 32, a flow path unit 33, and a piezo element unit 34. In FIG. 4, a wiring or the like for driving the piezo element PZT is omitted. In addition, although not shown, one head unit 31 includes a black ink nozzle row, a cyan ink nozzle row, a magenta ink nozzle row, and a yellow ink nozzle row on the lower surface thereof, for example, along the transport direction. Further, the print head 30 discharges ink of a relevant color from each nozzle row toward the print medium PM. In addition, one head unit 31 may include two or more nozzle rows. In addition, the print head 30 of the present embodiment may include a nozzle row having only a specific ink color. In addition, although an example in which one print head 30 is provided on the carriage 21 is described, two or more print heads 30 may be provided on the carriage 21. Various modifications are possible. In addition, various configurations are known for the print head 30 and the head unit 31, and the configurations can be widely applied in the present embodiment.

The case 32 is a member for accommodating and fixing the piezo element PZT or the like, and is made of a non-conductive resin material such as an epoxy resin.

The flow path unit 33 includes a flow path forming substrate 33*a*, the nozzle plate NP, and a vibration plate 33*c*. The nozzle plate NP is bonded to one surface of the flow path forming substrate 33*a*, and the vibration plate 33*c* is bonded to the other surface thereof. The flow path forming substrate 33*a* is formed with an empty portion, which includes a pressure chamber 331, an ink supply path 332, and a common ink chamber 333, and a groove. The flow path forming substrate 33*a* is made of, for example, a silicon substrate. The nozzle plate NP is provided with one or more nozzle rows composed of a plurality of nozzles NZ. The nozzle plate NP is made of a conductive plate-shaped member, for example, a thin metal plate. A diaphragm portion 334 is provided at a part, which corresponds to each pressure chamber 331, of the vibration plate 33*c*. The diaphragm portion 334 is deformed by the piezo element PZT to change a volume of the pressure chamber 331. The piezo element PZT and the nozzle plate NP are in an electrically insulated state by interposing the vibration plate 33*c*, an adhesive layer, and the like therebetween.

The piezo element unit 34 includes a piezo element group 341 and a fixing member 342. The piezo element group 341 has a comb teeth-like shape. Each comb teeth is the piezo element PZT. A tip surface of each piezo element PZT adheres to an island portion 335 of the relevant diaphragm portion 334. The fixing member 342 supports the piezo element group 341 and serves as an attachment portion with respect to the case 32. The piezo element PZT is an example of an electromechanical conversion element, and, when the drive signal is applied, the piezo element PZT expands and contracts in a longitudinal direction, thereby causing a change in pressure of liquid in the pressure chamber 331. In the ink in the pressure chamber 331, the change in pressure occurs due to a change in the volume of the pressure chamber 331. The ink droplets can be discharged from the nozzle NZ by utilizing the pressure change. Instead of the piezo element PZT as the electromechanical conversion element, a structure may be used in which the ink droplets are discharged by generating air bubbles according to the drive signal to be applied.

In addition, the liquid repellent film 338 is formed on the surface of the nozzle plate NP. As a result, the ink is repelled without wetting the surface of the nozzle plate NP, so that the ink can be easily removed through wiping which will be described later. When the liquid repellent film 338 is formed by forming a silane coupling agent (SCA) film and performing a drying treatment, an annealing treatment, or the like, the liquid repellent film 338, which is a thin film of approximately 5 nm to 30 nm, can be formed. When an adhesion property between the surface of the nozzle plate NP and the liquid repellent film 338 is low, as shown in FIG. 4, the intermediate film 337, which has the high adhesion property with both the surface of the nozzle plate NP and the liquid repellent film 338, may be formed. Here, it is assumed that the intermediate film 337 is present.

However, in a predetermined case, the above-described liquid repellent film 338 may deteriorate. Specifically, the predetermined case is a case of wiping the ink containing hard resin particles or a case of wiping using a wiper having a rough surface. The hard resin particles are, for example, carbon black and titanium oxide, which will be described later. Specifically, a fact that the liquid repellent film 338 deteriorates means that the liquid repellent film 338 is scraped off by the above-described particles and disappears.

Further, since the ink is not repelled at a spot where the liquid repellent film 338 deteriorates, a large amount of ink is likely to adhere to the surface of the nozzle plate NP. Therefore, even when the wiping described above is performed, remaining ink will be generated. In particular, when the liquid repellent film 338 in the vicinity of a nozzle opening deteriorates, the remaining ink is generated in the vicinity of the nozzle opening. As a result, although the details will be described later, there is a high possibility that flight bending occurs.

Although specific illustration is omitted, a predetermined pattern for imaging correction may be formed on the surface of the nozzle plate NP. Specifically, the formation of a predetermined pattern can be realized by forming a predetermined uneven pattern on the surface of the nozzle plate NP, forming a pattern having a color tone different from that of the liquid repellent film 338, and the like. By doing so, when the surface of the nozzle plate NP is imaged by the first imaging portion 71 described above, the nozzle surface image information NI which will be described later can be accurately acquired. The imaging correction is specifically distortion correction, rotation correction, or the like, but may be other corrections. In addition, the distortion correction is to correct the captured image displayed in a trapezoidal shape into a rectangular shape or a square shape. In addition, a factor that the captured image is displayed in the trapezoidal shape is, for example, that the first imaging portion 71 is tilted with respect to the surface of the nozzle plate NP.

Figure 5:
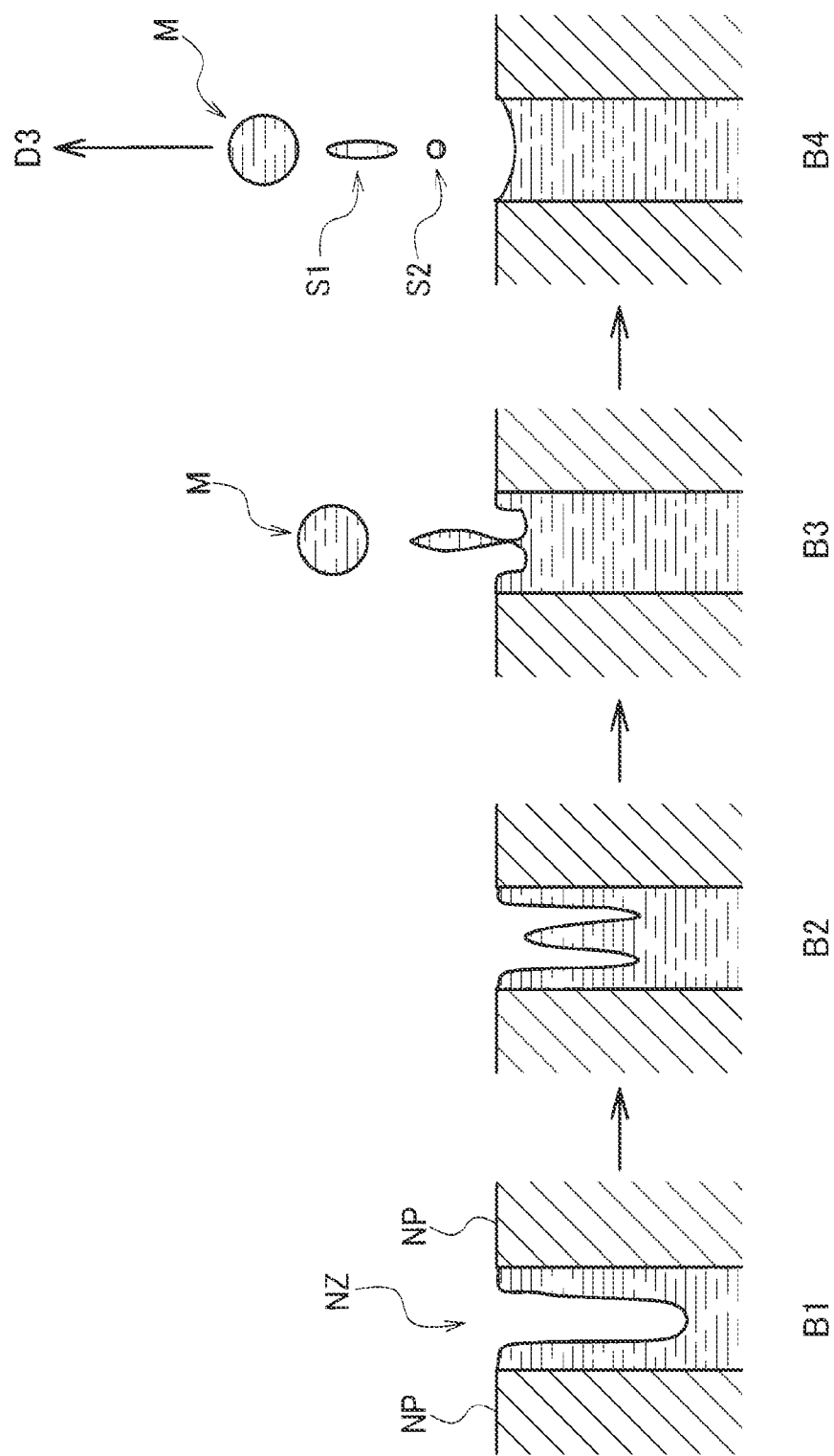
FIG. 5 is a diagram showing flight bending.

Next, a relationship between the remaining ink and the flight bending will be described with reference to FIG. 5 and FIG. 6. FIG. 5 is a diagram schematically showing an aspect of ink protrusion when the surface of the nozzle plate NP is normal, as a comparative example. In FIG. 5, the intermediate film 337 and the liquid repellent film 338 on the surface of the nozzle plate NP are omitted. The same applies to FIG. 6. In FIG. 5, a direction parallel to a direction D3 is a discharge direction of the ink on the design. Hereinafter, a liquid surface shape of the ink is referred to as a meniscus. As shown in B1 and B2 of FIG. 5, when the piezo element PZT is driven, the meniscus is pulled in a direction opposite to the discharge direction, and, thereafter, the ink is ejected with the force that the meniscus tries to return to an original state. At this time, since the liquid droplet ejected from the nozzle has a constant velocity, the liquid droplet is stretched during flight. Therefore, as shown in B3 and B4, the liquid droplet is separated into a leading main liquid droplet M, a first satellite liquid droplet S1 generated thereafter, and a second satellite liquid droplet S2 smaller than the first satellite liquid droplet S1. In the comparative example of FIG. 5, since all of the main liquid droplet M, the first satellite liquid droplet S1, and the second satellite liquid droplet S2 fly along the direction D3, thereby landing at the same position on the print medium PM. Therefore, it is assumed that there is no problem in apparent printing.

Figure 6:
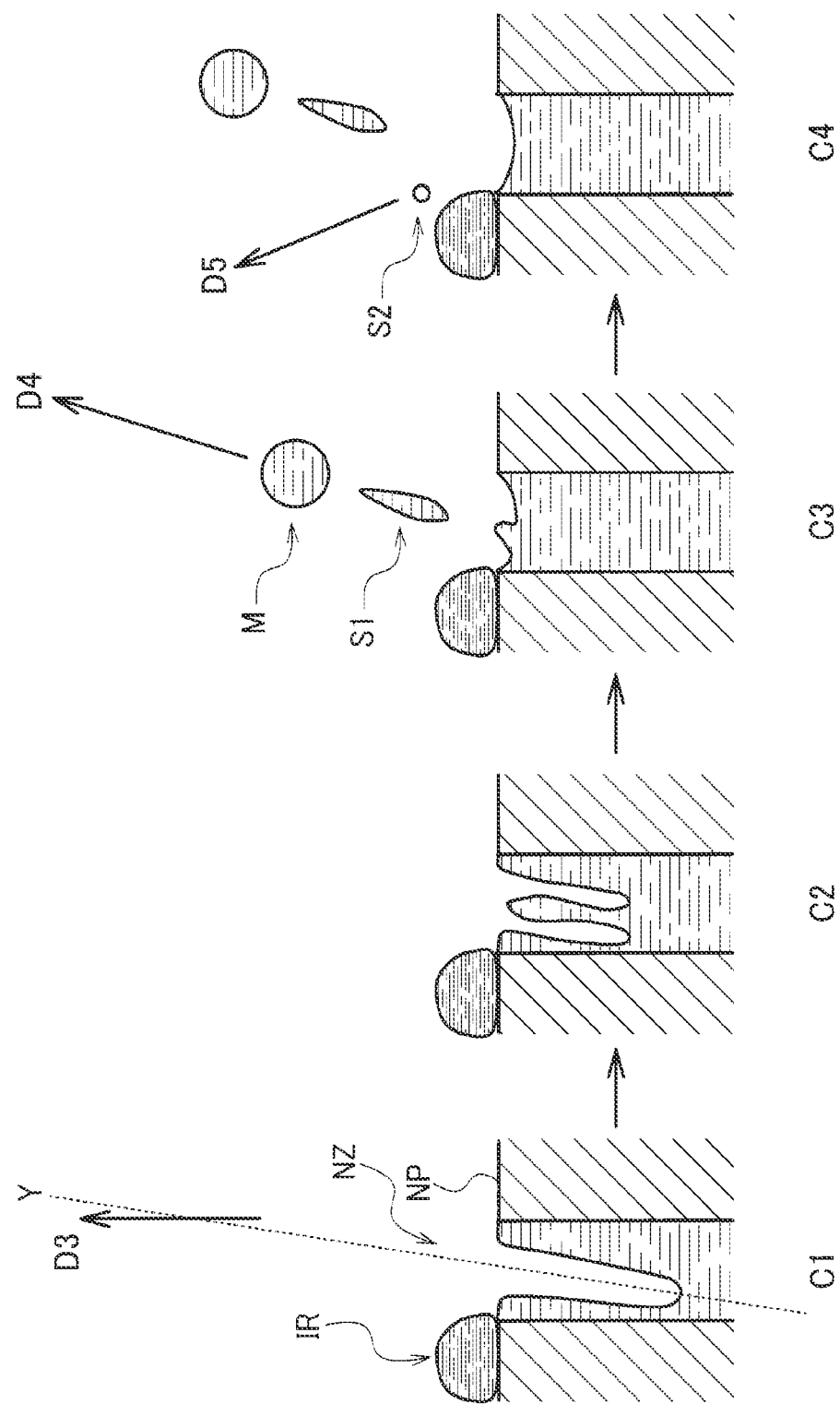
FIG. 6 is another diagram showing the flight bending.

On the other hand, as shown in C1 of FIG. 6, when the remaining ink IR is present in the vicinity of the nozzle NZ, a phenomenon in which the meniscus bends occurs due to an influence of being drawn to the remaining ink IR. Here, the phenomenon in which the meniscus bends means a phenomenon in which, when the meniscus is approximated to a parabola, a direction of a symmetry axis Y of the parabola is not parallel to the above-described direction D3. Therefore, as shown in C2 and C3, the main liquid droplet M and the first satellite liquid droplet S1 are ejected toward a direction D4 different from the direction D3. Further, as shown in C4, the second satellite liquid droplet S2 flies toward a direction D5 different from the direction D4 due to the influence of being drawn to the remaining ink IR. This difference occurs because the second satellite liquid droplet S2 has a smaller liquid droplet size than the main liquid droplet M and the first satellite liquid droplet S1, and has the weaker ejection force than the main liquid droplet M and the first satellite liquid droplet S1.

As described above, when the liquid repellent film 338 deteriorates, the flight bending occurs, so that print quality is lowered. In addition, when the liquid repellent film 338 deteriorates, the deteriorated liquid repellent film 338 cannot be recovered by a maintenance work, so that the head unit 31 should be replaced. Therefore, it is required to grasp an appropriate replacement time of the head unit 31. For example, when the method of JP-A-2018-136736 is applied, it is considered that the replacement time of the head unit 31 can be predicted from a frequency of use of the head unit 31.

However, the replacement timing of the head unit 31 needs to consider various other factors. Although there is a condition to be sufficiently recovered with only predetermined regular maintenance, the deterioration of the liquid repellent film 338 described above is not limited to be always proportional to the number of times that wiping is performed. Therefore, a case is considered where the liquid repellent film 338 is in a sufficiently usable state even the replacement time of the head unit 31 predicted from the frequency of use.

In addition, a factor other than the deterioration of the liquid repellent film 338 described above is also considered as a cause of the flight bending. The factor other than the deterioration of the liquid repellent film 338 is, for example, the adhesion of the foreign matter to the vicinity of the nozzle. In the case of the factor due to the adhesion of the foreign matter to the vicinity of the nozzle, the print quality can be restored as long as the foreign matter can be removed by performing the regular maintenance, so that it is not expected that the flight bending reoccurs. However, in a case of a factor due to the deterioration of the liquid repellent film 338, there is a high possibility that the flight bending suddenly reoccurs due to ink protrusion during printing performed again even when the surface of the nozzle plate NP can be completely cleaned by the regular maintenance. In the following description, it is assumed that the flight bending does not occur suddenly due to the factor other than the deterioration of the liquid repellent film 338.

In this way, the replacement time cannot be properly grasped by simply predicting and setting the regular replacement time from a usage situation or the number of times that maintenance is performed, and the like. There are problems in that, when the replacement time is too early, the maintenance man-hours and costs increase, and, when the replacement time is too late, printing failure frequently occurs in the middle of production of printed matters.

Therefore, as described above, the information processing system 200 of the present embodiment includes a storage portion 210, a reception portion 220, and a processing portion 230. In addition, the storage portion 210 stores the learned model 212 obtained by performing machine learning on the replacement condition for the print head based on the data set in which the nozzle surface image information NI obtained by photographing the nozzle surface of the print head and the replacement necessity information representing replacement necessity of the print head or a replacement timing of the print head are associated with each other. In addition, the reception portion 220 receives the nozzle surface image information NI. In addition, the processing portion 230 outputs the replacement necessity information of the print head 30 based on the received nozzle surface image information NI and the learned model 212.

The process performed by the information processing system 200 of the present embodiment may be realized as an information processing method. In other words, the information processing method of the present embodiment includes storing the learned model 212, receiving the nozzle surface image information NI, and outputting the replacement necessity information of the print head based on the received nozzle surface image information NI and the learned model 212. In addition, the learned model 212 performs machine learning on the replacement condition for the print head based on the data set in which the nozzle surface image information NI obtained by photographing the nozzle surface of the print head 30 and the replacement necessity information representing the replacement necessity of the print head or the replacement timing of the print head are associated with each other.

By doing so, it is possible to appropriately grasp transition of a deterioration situation of the liquid repellent film 338 of the nozzle plate NP. Therefore, the expensive head unit 31 can be replaced at an appropriate timing. As a result, a maintenance plan can be optimized, so that maintenance costs can be reduced and an operating rate of a printing device can be increased.

Next, a correspondence relationship between the information processing system 200 and the printing device 1 will be described with reference to FIG. 7 to FIG. 9. In addition, the learned model 212 stored in the storage portion 210 is generated by the learning portion 420, and the relationship thereof will also be described.

The method of the present embodiment can be applied to various embodiments. For example, in a configuration example shown in a block diagram of FIG. 7, the learning device 400 is present outside the printing device 1, and the information processing system 200 corresponds to the printing device 1. In this case, the storage portion 210 of the information processing system 200 corresponds to the memory 103 of the printing device 1. In addition, the reception portion 220 corresponds to an interface (not shown) that reads out the nozzle surface image information NI and the like stored in the memory 103, and may correspond to the interface portion 101. In addition, the processing portion 230 corresponds to the controller 100 of the printing device 1. More specifically, it can be said that the processing portion 230 corresponds to the processor 102 of the printing device 1. The learning device 400 corresponds to, for example, external equipment connected to the printing device 1 via a network, but may correspond to external equipment existing independently. Here, the external equipment is included in, for example, a server system, or may be included in cloud computing. Further, the learned model 212 is generated by the learning portion 420 of the learning device 400 existing outside the information processing system 200, and the storage portion 210 of the information processing system 200 can receive the learned model 212 from the learning device 400 by predetermined means. The predetermined means is, for example, a wireless network, or may be a wired network or a predetermined storage medium. Here, the network may be a private network such as an intranet, or may be a public communication network such as the Internet. As a result, it is possible to store the learned model 212 in the storage portion 210.

However, in a case of a configuration example of FIG. 7, the processing portion 230 can execute the inference process which will be described later but cannot execute a learning process which will be described later. That is, the learned model 212 cannot be updated only by the printing device 1. Therefore, as shown in FIG. 7, the processing portion 230 may perform a process of transmitting the data set, in which the nozzle surface image information NI and the replacement necessity information are associated with each other, to the acquisition portion 410 of the learning device 400. By doing so, when the learning portion 420 updates the learned model 212 by performing the learning process which will be described later, it is possible to realize the update of the learned model 212 in the printing device 1 by performing a process of transmitting the updated learned model 212 from the learning portion 420 to the storage portion 210 and overwriting the learned model 212 by the storage portion 210. When the learned model 212 is an existing one and has a high level of completion, the update is not necessarily needed. In this case, for example, when the same printing device 1 is additionally introduced, the information processing system 200 that is not connected to the learning device 400 can be constructed by storing the learned model 212 in the storage portion 210 in advance.

Here, the learning device 400 of FIG. 7 will be described in detail. As described above, the learning device 400 includes the acquisition portion 410 and the learning portion 420 described above. The acquisition portion 410 acquires the training data used for learning, and the learning portion 420 performs machine learning based on the training data.

The acquisition portion 410 is, for example, a communication interface that acquires the training data from another device. Alternatively, the acquisition portion 410 may acquire the training data held by the learning device 400. That is, the learning device 400 includes a storage portion (not shown), and the acquisition portion 410 functions as an interface for reading the training data from the storage portion. In addition, here, the learning is, for example, the supervised learning as described above.

The learning portion 420 performs machine learning based on the training data acquired by the acquisition portion 410, and generates the learned model 212. The learning portion 420 of the present embodiment includes the following hardware. The hardware can include at least one of the circuit that processes the digital signal and the circuit that processes the analog signal. For example, the hardware can consist of one or more circuit devices mounted on the circuit substrate or one or more circuit elements. One or more circuit devices are, for example, ICs and the like. The one or more circuit elements are, for example, resistors, capacitors, and the like.

In addition, the learning portion 420 may be realized by the following processor. The learning device 400 of the present embodiment includes a memory that stores information and a processor that operates based on the information stored in the memory. The information includes, for example, a program and various data. The processor includes the hardware. It is possible to use various processors, such as a CPU, a GPU (Graphics Processing Unit), and a DSP (Digital Signal Processor), as the processor. The memory may be a semiconductor memory such as a static random access memory (SRAM) or a dynamic random access memory (DRAM), may be a register, may be a magnetic storage device such as a hard disk device, and may be an optical storage device such as an optical disk device. For example, the memory stores commands that can be read by the computer, and, when the commands are executed by the processor, the functions of respective portions of the learning device 400 are realized as processes. Here, the command may be a command of a command set constituting the program, or may be a command instructing an operation with respect to a hardware circuit of the processor. For example, the memory stores a program that defines a learning algorithm, and the processor executes the learning process by performing an operation according to the learning algorithm.

More specifically, the acquisition portion 410 acquires the data set in which the nozzle surface image information NI obtained by photographing the nozzle surface of the print head 30 and the replacement necessity information representing the replacement necessity of the print head 30 or the replacement timing of the print head 30 are associated with each other. The learning portion 420 performs machine learning on the replacement necessity of the print head 30 based on the acquired data set. In other words, the learning device 400 of the present embodiment includes the acquisition portion 410 that acquires the data set in which the nozzle surface image information NI obtained by photographing the nozzle surface of the print head 30 and the replacement necessity information representing the replacement necessity of the print head 30 or the replacement timing of the print head 30 are associated with each other, and the learning portion 420 that performs machine learning on the replacement necessity of the print head 30 based on the acquired data set.

By doing so, it is possible to output the learned model 212 that appropriately grasps the transition of the deterioration situation of the liquid repellent film 338 of the nozzle plate NP. As a result, when the learned model 212 is applied to the information processing system 200, the head unit 31 of the printing device 1 can be replaced at an appropriate timing. As a result, a maintenance plan can be optimized, so that maintenance costs can be reduced and an operating rate of a printing device can be increased.

Figure 7:
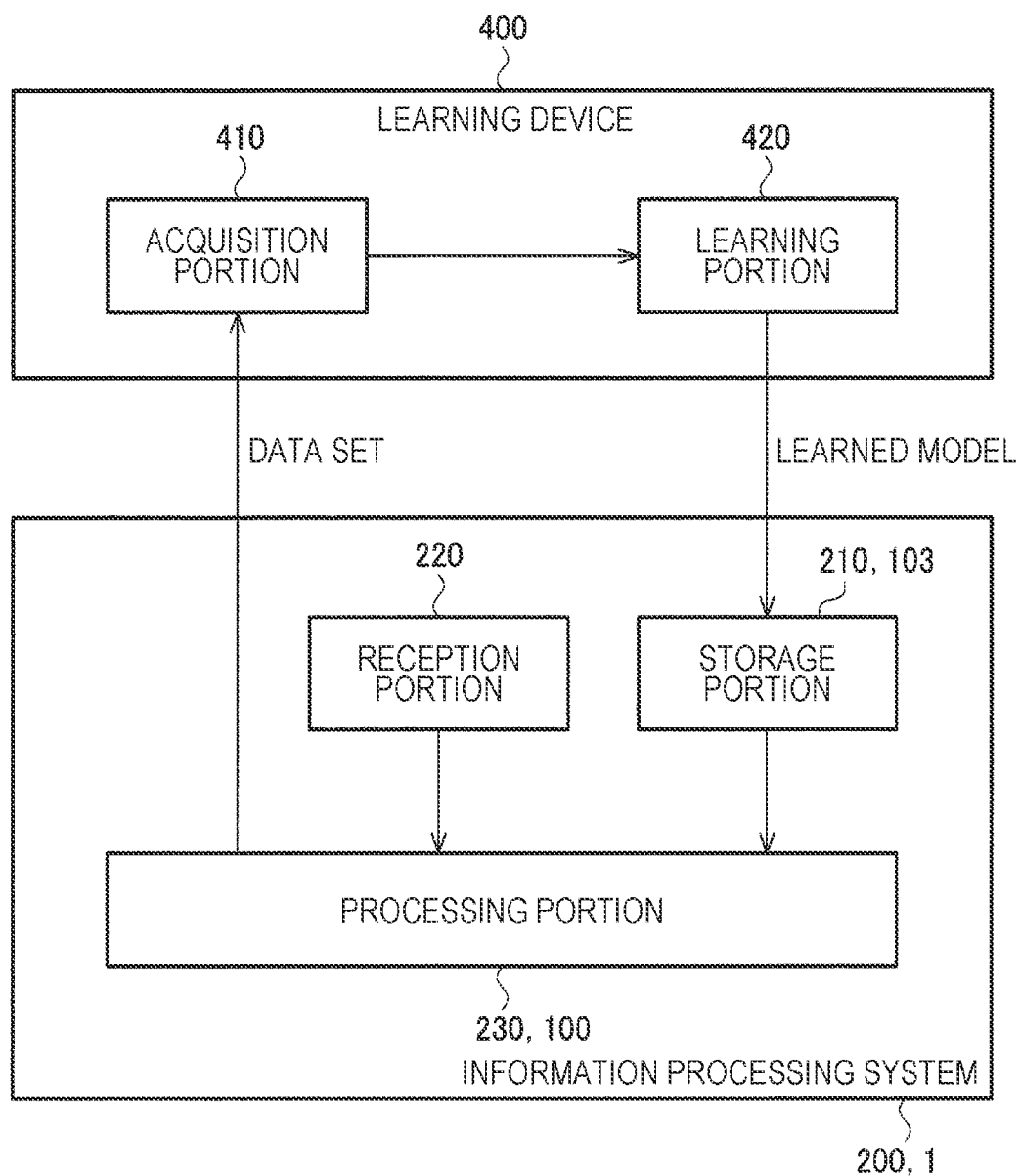
FIG. 7 is a diagram showing a correspondence relationship between the printing device and the information processing system.

In addition, as described above, the method of the present embodiment is not limited to the configuration example shown in FIG. 7, and various modifications can be performed. For example, as shown in a block diagram of FIG. 8, a configuration example may be provided in which the above-described acquisition portion 410 and learning portion 420 are included in the information processing system 200, and the information processing system 200 corresponds to the printing device 1. The same points as in FIG. 7 will not be described. In this case, the learning portion 420 corresponds to the controller 100 of the printing device 1. Although not shown, the printing device 1 may include a plurality of controllers 100, the learning portion 420 may correspond to a controller 100A, and the processing portion 230 may correspond to a controller 100B. As the same as in the reception portion 220, the acquisition portion 410 corresponds to an interface (not shown) that reads out the nozzle surface image information NI and the like stored in the memory 103, and may also correspond to the interface portion 101.

Figure 8:
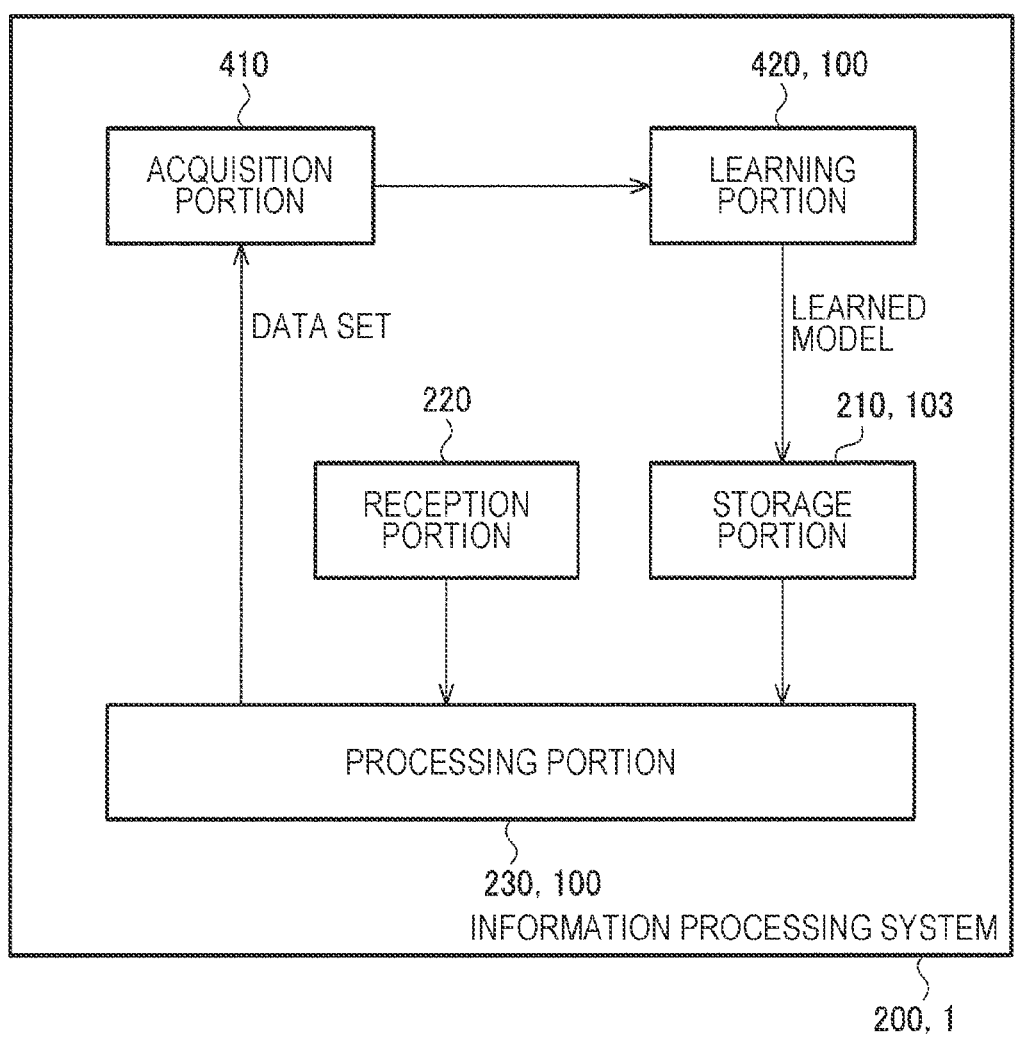
FIG. 8 is another diagram showing the correspondence relationship between the printing device and the information processing system.
Figure 9:
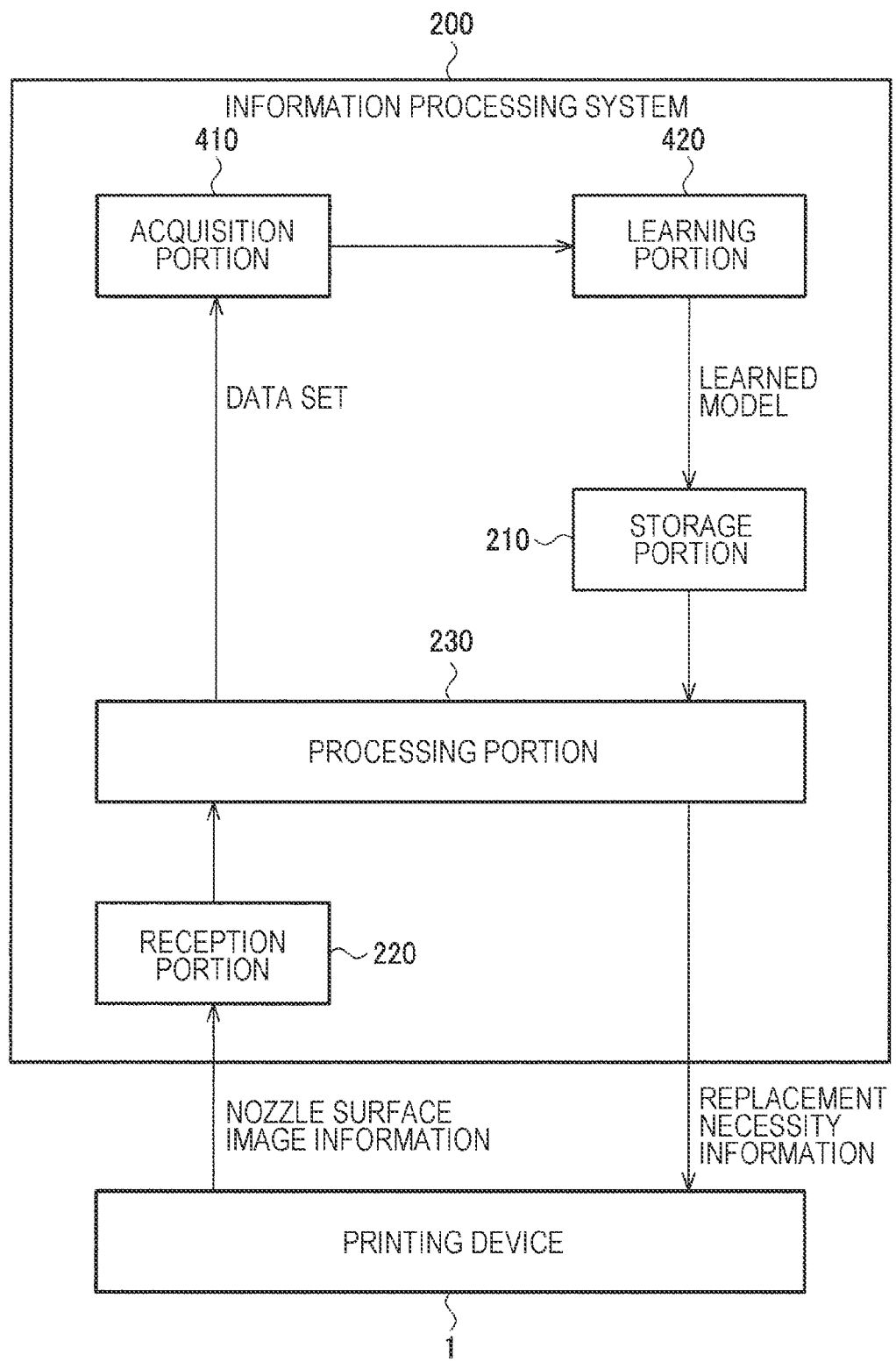
FIG. 9 is another diagram showing the correspondence relationship between the printing device and the information processing system.

In addition, FIG. 8 is a configuration example in which all of the storage portion 210, the reception portion 220, the processing portion 230, the acquisition portion 410, and the learning portion 420 are included in the printing device 1. However, as shown in a block diagram of FIG. 9, a configuration example may be provided in which all of those correspond to the information processing system 200 existing outside the printing device 1. In this case, as shown in FIG. 9, it is possible to grasp the replacement necessity information of the print head 30 in a side of the printing device 1 by transmitting data, such as the nozzle surface image information NI, from the printing device 1 to the reception portion 220 of the information processing system 200, performing the inference process which will be described later based on the nozzle surface image information by the processing portion 230, and transmitting the replacement necessity information to the printing device 1.

In addition, although not shown, the method of the present embodiment may be applied to a configuration example other than the configuration examples described with reference to FIG. 7 to FIG. 9. That is, the user can arbitrarily assign the storage portion 210, the reception portion 220, the processing portion 230, the acquisition portion 410, and the learning portion 420 to either the printing device 1 or an external system. In the following description, it is assumed that the information processing system 200, the learning device 400, and the printing device 1 are configured based on FIG. 7.

Figure 10:
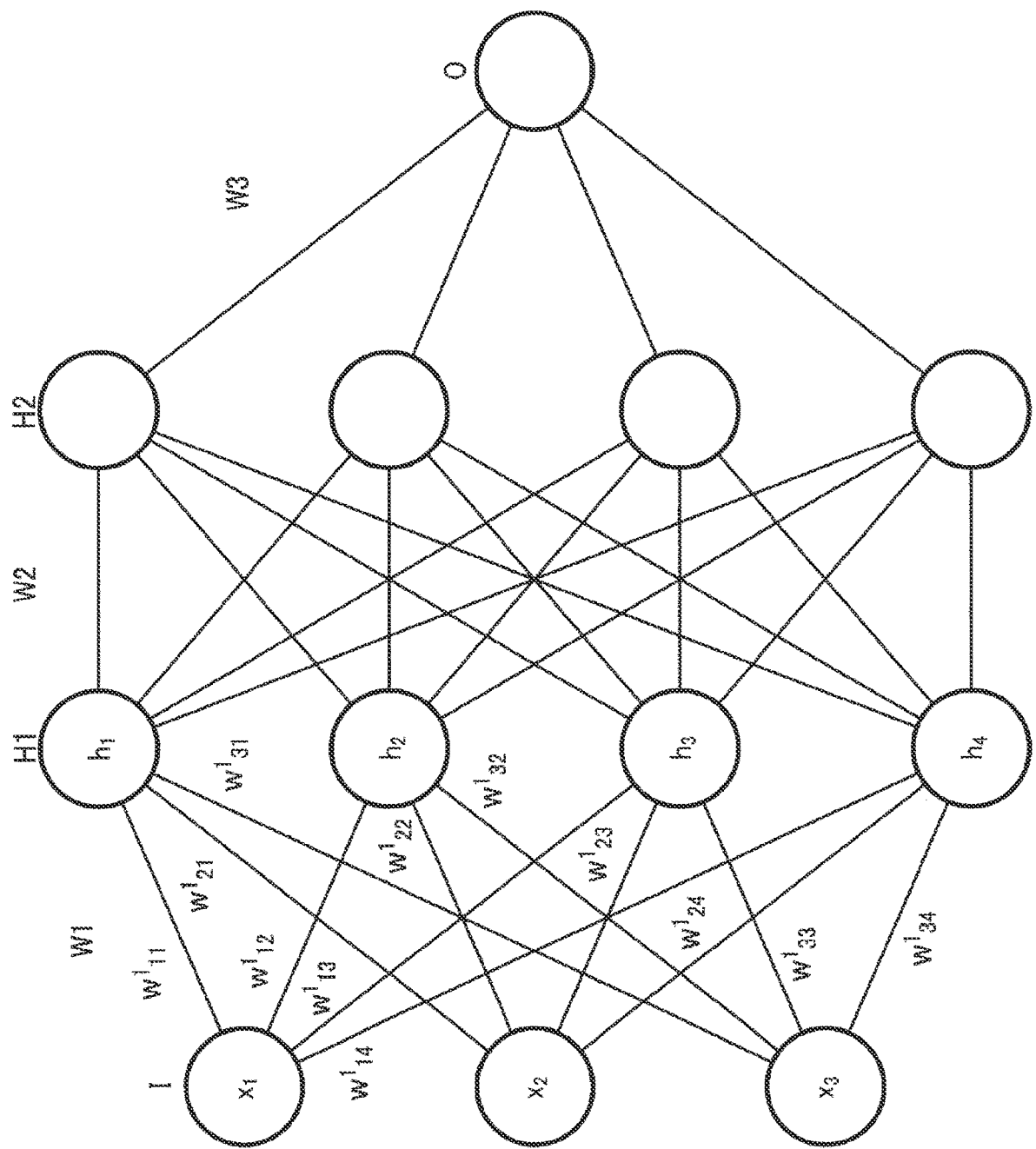
FIG. 10 is a diagram showing a neural network.

Next, the details of a process using machine learning in the present embodiment will be described. The machine learning in the present embodiment is, for example, machine learning using a neural network. FIG. 10 is an example of a basic structure of the neural network. The neural network is a mathematical model that simulates a brain function on a computer. One circle in FIG. 10 is called a node or a neuron. In the example of FIG. 10, the neural network has an input layer, two intermediate layers, and an output layer. The input layer is I, the intermediate layers are H1 and H2, and the output layer is O. In addition, in the example of FIG. 10, the number of neurons in the input layer is three, the number of neurons in the intermediate layer is four, and the number of neurons in the output layer is one. However, the number of layers in the intermediate layer and the number of neurons included in each layer can be modified in various ways. Each neuron included in the input layer is connected to neurons of H1 which is the first intermediate layer. The neurons included in the first intermediate layer are connected to the neurons of H2, which is the second intermediate layer, and the neurons included in the second intermediate layer are connected to the neuron of the output layer, respectively. The intermediate layer may be rephrased as a hidden layer.

Each input layer is a neuron that outputs an input value. In the example of FIG. 10, the neural network receives $x_1$, $x_2$, and $x_3$ as inputs, and the respective neurons in the input layer output $x_1$, $x_2$, and $x_3$, respectively. Any preprocessing may be performed on the input values, and the respective neurons in the input layer may output values obtained after the preprocessing.

In each neuron after the intermediate layer, a calculation that imitates an aspect in which information is transmitted as an electric signal in the brain is performed. In the brain, the ease of transmission of the information changes according to the synaptic connection strength, so that the neural network expresses the connection strength with a weight W. W1 in FIG. 10 is the weight between the input layer and the first intermediate layer. W1 represents a set of weights between a given neuron included in the input layer and a given neuron included in the first intermediate layer. When a weight between a p-th neuron in the input layer and a q-th neuron in the first intermediate layer is expressed as $w^1_{pq}$, W1 in FIG. 10 is information including 12 weights of $w^1_{11}$ to $w^1_{34}$. In a broader sense, the weight W1 is information consisting of weights as many as the product of the number of neurons in the input layer and the number of neurons in the first intermediate layer.

In a first neuron of the first intermediate layer, a calculation shown in the following Equation (1) is performed. In one neuron, a calculation of performing sum-product on an output of each neuron in an immediately before layer connected to the neuron and adding a bias is performed. The bias in the following Equation (1) is b1.

$$h_1 = f\left(\sum_i w^1_{i1} \cdot x_i + b_1\right) \quad (1)$$

In addition, as shown in the above Equation (1), an activation function f, which is a non-linear function, is used in the calculation with one neuron. As the activation function f, for example, a ReLU function shown in the following Equation (2) is used. The ReLU function becomes 0 when a variable is 0 or less and becomes a value of the variable itself when the variable is larger than 0. However, it is known that various functions can be used as the activation function f, that is, a sigmoid function may be used or a function obtained by improving the ReLU function may be used. In the above Equation (1), a calculation expression for h1 is illustrated, but the same calculation may be performed on other neurons in the first intermediate layer.

$$f(x) = \max(0, x) = \begin{cases} 0 & (x \leq 0) \\ x & (x \geq 0) \end{cases} \quad (2)$$

In addition, the same applies to subsequent layers. For example, when a weight between the first intermediate layer and the second intermediate layer is set to W2, a product sum calculation is performed using the outputs of the first intermediate layer and the weight W2, the bias is added, and a calculation of applying the activation function is performed on the neurons in the second intermediate layer. At the neuron in the output layer, a calculation is performed of weighting and adding the outputs of the immediately before layer and adding the bias. In the example of FIG. 10, the layer immediately before the output layer is the second intermediate layer. The neural network uses a result of the calculation in the output layer as an output of the neural network.

As can be seen from the above description, it is necessary to set an appropriate weight and bias in order to obtain a desired output from inputs. Hereinafter, the weight is also referred to as a weighting coefficient. Further, the weighting coefficient may include the bias. In the learning, a data set is prepared in which a given input x and a correct output at the input are associated with each other. The correct output is the correct answer label. The learning process of the neural network can be considered as a process of obtaining the most probable weighting coefficient based on the data set. In the learning process of the neural network, various learning methods, such as a backpropagation method, are known. In the present embodiment, since the learning methods can be widely applied, detailed description thereof will be omitted. The learning algorithm when using the neural network is an algorithm of performing, for example, both a process of performing a calculation, such as the above Equation (1), to acquire a forward result and a process of updating weighting coefficient information using an error backpropagation method.

In addition, the neural network is not limited to the configuration shown in FIG. 10. For example, a widely known convolutional neural network (CNN) may be used in the learning process of the present embodiment and an inference process which will be described later. The CNN includes a convolution layer and a pooling layer. In the convolution layer, a convolution calculation is performed. Here, specifically, the convolution calculation is a filtering process. In the pooling layer, a process of reducing vertical and horizontal sizes of data is performed. When the learning process is performed using the backpropagation method or the like in the CNN, a filter characteristic used for the convolution calculation is learned. That is, the weighting coefficient in the neural network includes the filter characteristic in the CNN. CNN is preferable in a case where information based on a nozzle plate image or two-dimensional image data as the discharge result image information is used.

Hereinabove, an example in which the learned model 212 is a model using the neural network is described. However, the machine learning in the present embodiment is not limited to a method using the neural network. For example, it is possible to apply machine learning using various well-known methods, such as a support vector machine (SVM), or machine learning using a method developed from the various methods to the method of the present embodiment.

Figure 11:
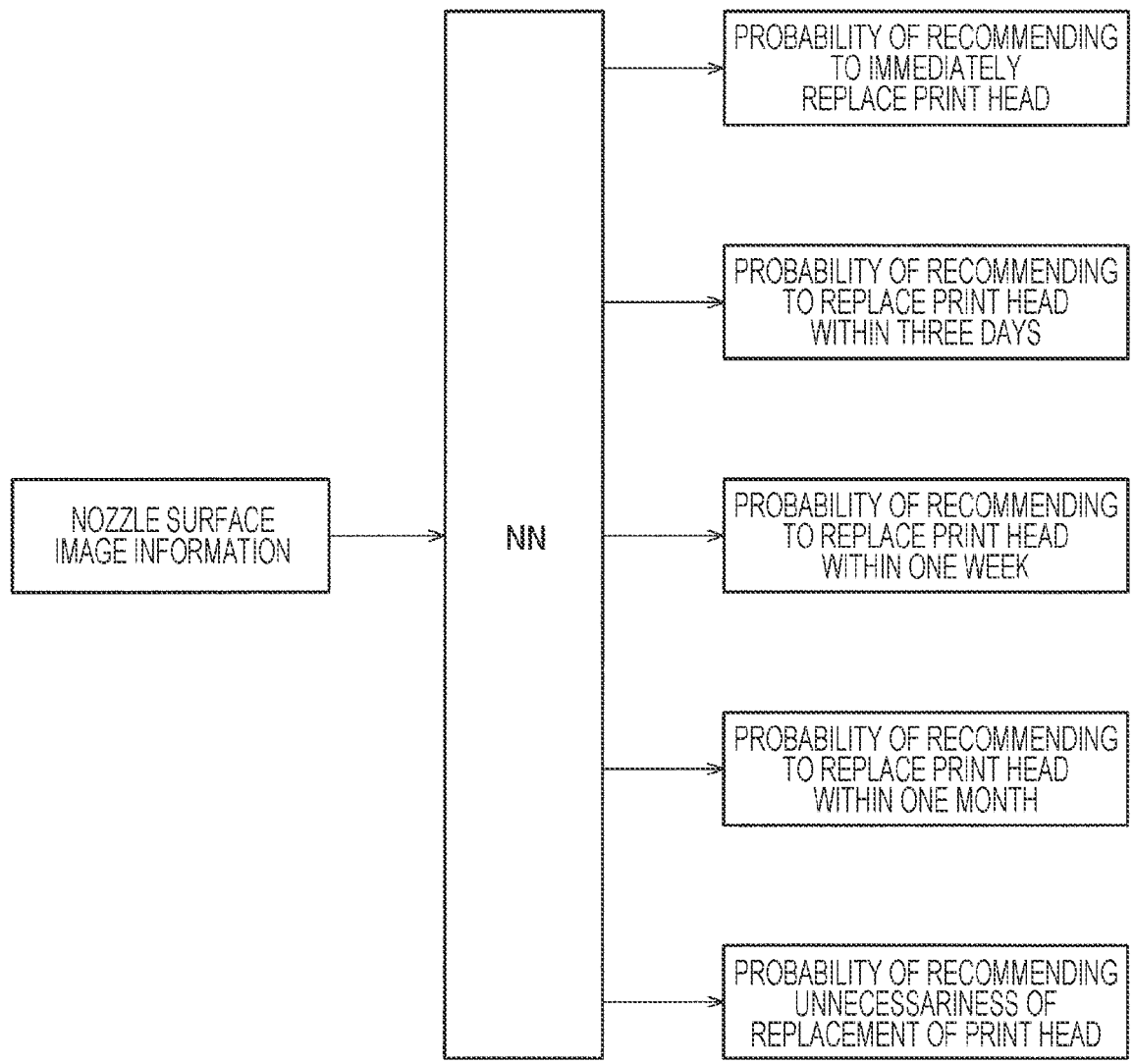
FIG. 11 is a diagram showing an example of input and output of the neural network.

FIG. 11 is a diagram showing an example of input and output of the neural network to which the method of the present embodiment is applied. In FIG. 11, the neural network is abbreviated as NN. The same applies to FIG. 16 which will be described later. The neural network receives the nozzle surface image information NI as an input and outputs the replacement necessity information as output data. As described above, the nozzle surface image information NI is the image information imaged by the first imaging unit 70. The replacement necessity information is information which specifies, for example, any one of N types of information related to the replacement of the print head 30. N is an integer of 2 or more. The N types of information related to the replacement of the print head 30 are information related to the replacement necessity of the print head 30 or the replacement timing of the print head 30. More specifically, as shown in FIG. 11, in addition to information representing recommendation of the immediate replacement of the print head 30 and information representing recommendation of unnecessariness of the replacement of the print head 30, the information is information representing a timing related to the recommendation of the replacement of the print head 30. As shown in FIG. 11, the timing related to the recommendation of the replacement of the print head 30 is not limited to three types, that is, within three days, within one week, and within one month. When the output layer of the neural network is a widely known softmax layer, the replacement necessity information is probability data whose total value of N outputs is 1.

For example, in a learning stage, the nozzle surface image information NI is accumulated while operating the printing device 1 in a predetermined manner. Here, the predetermined operation includes a test operation before shipment, an operation when a prototype is manufactured, and the like. For example, the printing device 1 is continuously operated, and an optimum specific timing for replacing the print head 30 is determined. Further, the nozzle surface image information NI acquired between the start of the operation and the specific timing corresponds to one of the replacement necessity information which is the correct answer label based on an acquisition timing of the nozzle surface image information NI. For example, in the case of FIG. 11, when the acquisition timing of a certain nozzle surface image information NI is two days before the specific timing, the nozzle surface image information NI is associated with information representing the recommendation of the immediate replacement of the print head. In addition, when the acquisition timing of another nozzle surface image information NI is 5 days before the specific timing, the nozzle surface image information NI is associated with information representing recommendation of the replacement of the print head within three days. When data of an average operating time of the printing device 1 for each day can be input as separate input data and the average operating time data is changed, association of the nozzle surface image information NI with the replacement necessity information can be changed. In the following description, it is assumed that the operating time per day is constant. In addition, in the learning stage here, there is a case where the printing failure occurs until an optimum replacement timing of the print head 30 can be determined. However, since the purpose here is to generate the training data, prevention of the printing failure is not considered.

Next, the nozzle surface image information NI will be described. The nozzle surface image information NI is information based on an image of the surface of the nozzle plate NP imaged by the first imaging portion 71 as described above. In other words, the nozzle surface image information NI is an image obtained by photographing a nozzle plate surface of the print head 30. By doing so, since a state of the surface of the nozzle plate NP can be acquired in the form of imaging data, machine learning can be performed on the state of the surface of the nozzle plate NP.

Figure 12:
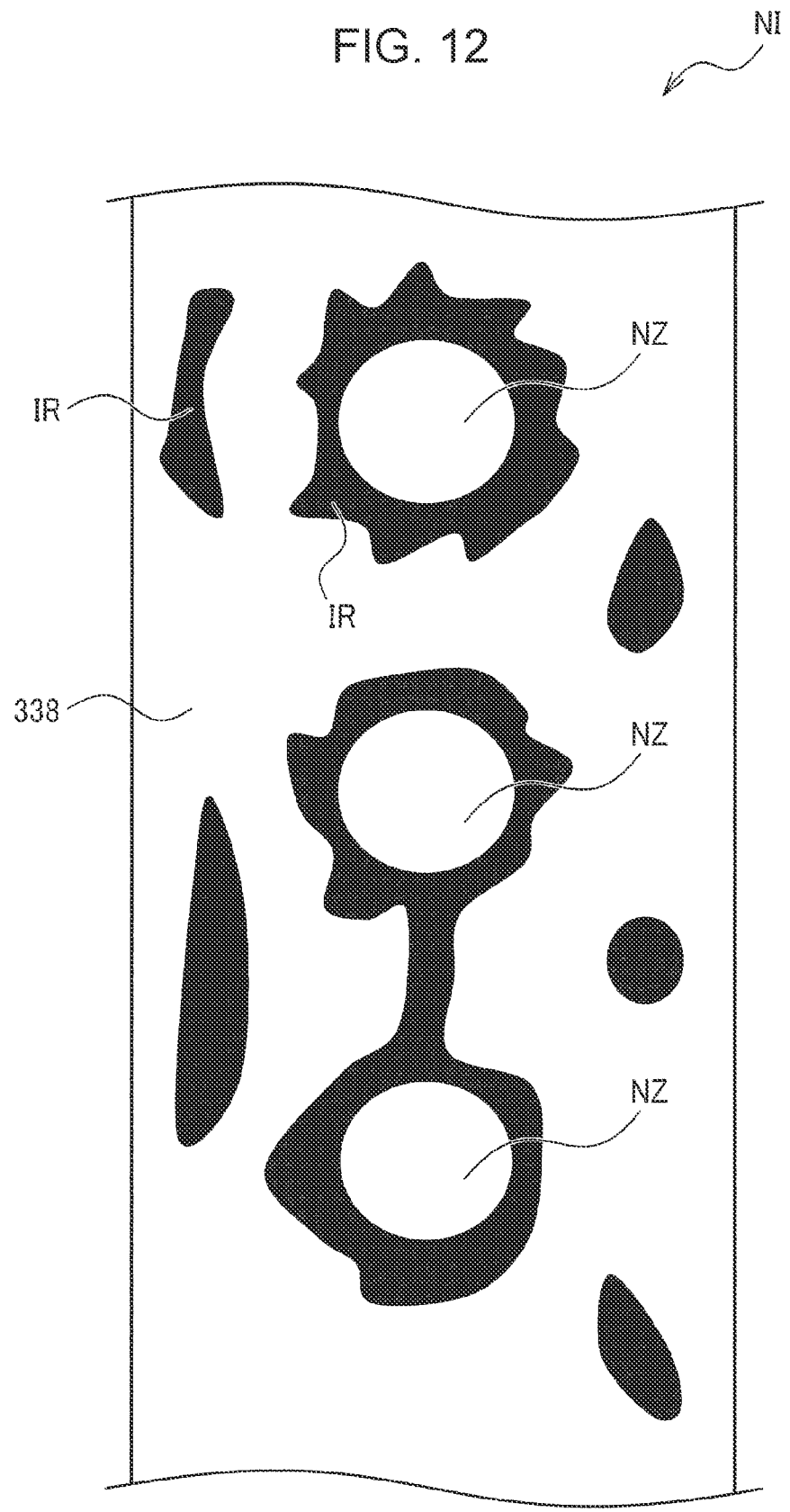
FIG. 12 is a diagram showing an example of nozzle surface image information.

More specifically, the amount of remaining ink on the surface of the nozzle plate NP can be determined based on the nozzle surface image information NI. For example, as shown in FIG. 12, when the surface of the nozzle plate NP is imaged, the remaining ink IR can be confirmed. Further, when predetermined image processing is performed on image data as shown in FIG. 12, the amount of remaining ink can be grasped. The predetermined image processing is, for example, a process of calculating an area of a part of the remaining ink IR with respect to an image area of the surface of the nozzle plate NP, a process of calculating a shade of a color of a part of the remaining ink IR, and the like. However, another process may be provided.

In this way, machine learning is performed by the learning portion 420 while using a data set in which the amount of remaining ink is used as the input data and the replacement necessity information is used as the output data, a learned model 212 is generated, and the learned model 212 is stored in the storage portion 210. Further, in the actual operation of the printing device 1, the processing portion 230 performs the inference process which will be described later based on the amount of remaining ink and the learned model 212, and outputs the replacement necessity information. In other words, the processing portion 230 determines the amount of remaining ink on the nozzle plate surface based on the nozzle surface image information, and outputs the replacement necessity information based on the amount of remaining ink and the learned model. By doing so, machine learning can be performed based on the data obtained by quantifying the state of the surface of the nozzle plate NP, so that the replacement necessity information can be estimated with higher accuracy.

For example, the nozzle surface image information NI is accumulated by imaging the surface of the nozzle plate NP of the print head 30 at each predetermined timing from the time of new introduction to the time of replacement, and the acquisition portion 410 acquires each nozzle surface image information NI. The learning portion 420 performs classification on the acquired nozzle surface image information NI, and associates the nozzle surface image information NI with one of the replacement necessity information. Here, the predetermined timing is, for example, a timing immediately before performing the wiping in the regular maintenance, but may be another timing. In addition, in addition to the training data consisting of data of the amount of remaining ink, machine learning may be performed using, for example, the training data based on the positional information of the remaining ink IR. For example, the weighting coefficient may be learned by considering a fact that there is a high possibility that the nozzle surface image information NI in which the remaining ink IR is present around an edge of the nozzle NZ and the nozzle surface image information NI in which the remaining ink IR is present between the nozzles NZ induces flight bending, as shown in FIG. 12.

In addition, the amount of scraped liquid repellent film on the surface of the nozzle plate NP may be determined based on the nozzle surface image information NI. Machine learning is performed by the learning portion 420 while using a data set in which the amount of scraped liquid repellent film is used as the input data and the replacement necessity information is used as the output data, the learned model 212 is generated, and the learned model 212 is stored in the storage portion 210. Further, in an actual operation of the printing device 1, the processing portion 230 performs the inference process which will be described later based on the amount of scraped liquid repellent film and the learned model 212, and outputs the replacement necessity information. In other words, the processing portion 230 determines the amount of scraped liquid repellent film on the nozzle plate surface based on the nozzle surface image information NI, and outputs the replacement necessity information based on the amount of scraped liquid repellent film and the learned model 212.

Figure 13:
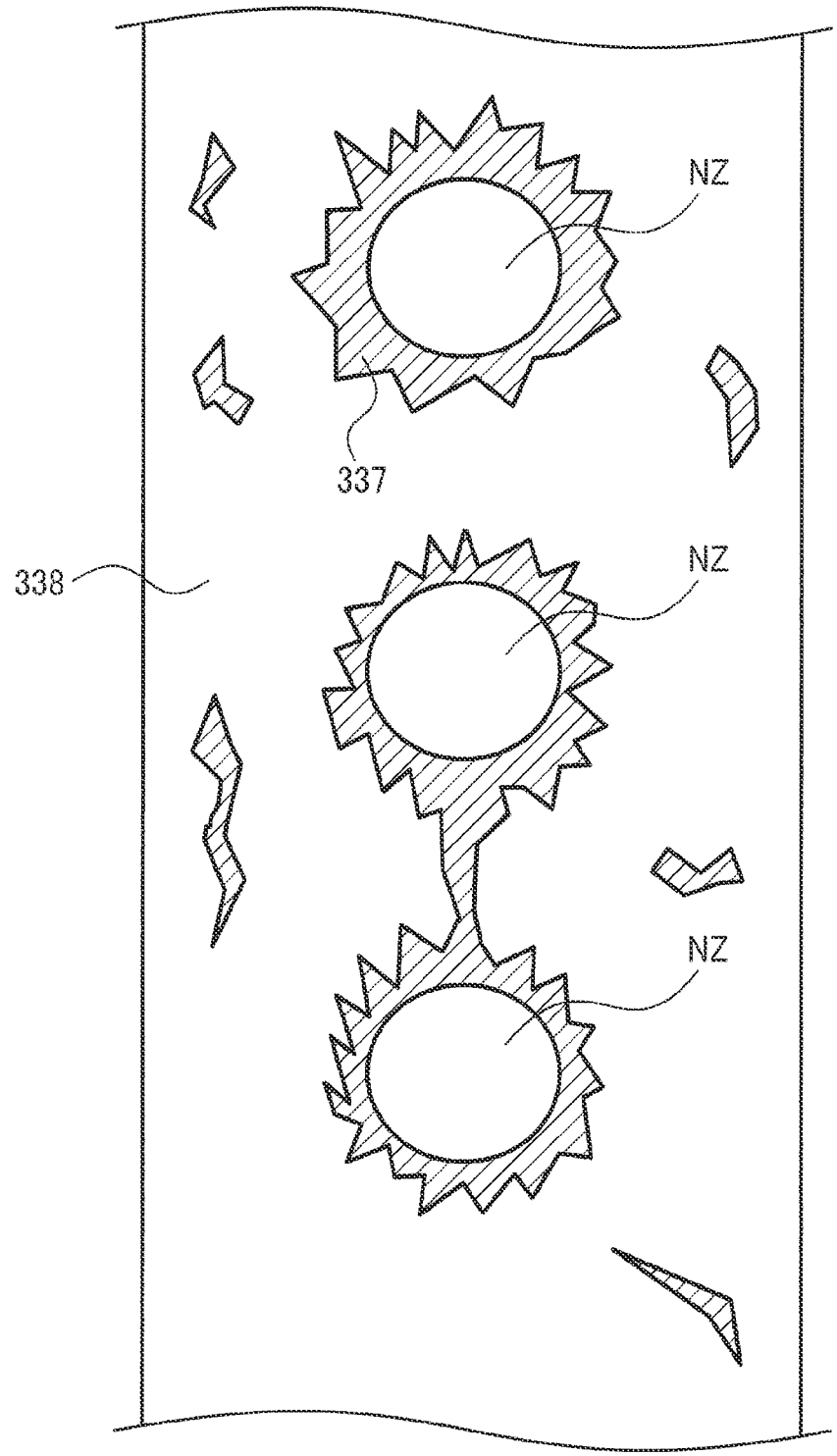
FIG. 13 is another diagram showing the example of the nozzle surface image information.

For example, when deterioration of print quality is confirmed, the test pattern PT shown in FIG. 3 is printed, deviation of a landing position of the nozzle NZ is inspected, and maintenance is performed. When the foreign matters or mists adhere to the vicinity of the nozzle NZ, the print quality can be restored by maintenance. However, when the liquid repellent film 338 described above in FIG. 4 deteriorates, flight bending is likely to occur in the middle of printing after maintenance is executed. In addition, the more severe the deterioration of the liquid repellent film 338, the higher the occurrence frequency of flight bending. For example, when the surface of the nozzle plate NP is imaged at the predetermined timing based on a predetermined imaging condition, as shown in FIG. 13, the nozzle surface image information NI can be acquired which includes the image of the liquid repellent film 338 and an image in which the liquid repellent film 338 disappears and the intermediate film 337 is exposed. Here, the predetermined timing is, for example, a timing immediately after performing wiping in the regular maintenance, but may be another timing. In addition, in the nozzle surface image information NI shown in FIG. 13, it is assumed that there is no ink remaining after wiping. Since the ink discharged in the middle of printing is not repelled at a spot where the liquid repellent film 338 deteriorates, the remaining ink IR is generated to correspond to the deteriorated spot as shown in FIG. 12, so that influence on the meniscus described above in FIG. 6 is generated. As described above, the amount of scraped liquid repellent film contributes correspondence to the state of the surface of the nozzle plate NP.

Further, the amount of scraped liquid repellent film can be treated as quantitative data by performing image processing or the like for calculating the area of the liquid repellent film 338 or the area of the intermediate film 337 with respect to the nozzle surface image information NI shown in FIG. 13. Further, as in the case of the remaining ink IR, the acquisition portion 410 acquires a data set in which an area of the amount of scraped liquid repellent film and a period until the print head 30 is replaced are associated with each other, and the learning portion 420 performs machine learning on the data set as the training data and generates the learned model 212. In addition, the training data is not limited thereto, and may be, for example, training data using features such as a deteriorated position of the liquid repellent film 338. For example, weighting may be learned by considering that the nozzle surface image information NI in which the deterioration of the liquid repellent film 338 is observed at a position close to the nozzle NZ or the nozzle surface image information NI in which the deterioration of the liquid repellent film 338 is observed so as to straddle the nozzle NZ may be the input data which has a high possibility that induces flight bending.

Both the nozzle surface image information NI obtained by imaging the remaining ink IR shown in FIG. 12 and the nozzle surface image information NI obtained by imaging the deterioration of the liquid repellent film 338 shown in FIG. 13 may be used as the input data. For example, it is assumed that there is a case where data having a high area ratio of remaining ink IR is acquired from the nozzle surface image information NI imaged immediately before the predetermined wiping and data having a low area ratio of the deterioration of the liquid repellent film 338 is acquired from the nozzle surface image information NI imaged immediately after the predetermined wiping. In this case, since the high area ratio of the remaining ink IR is estimated due to a factor other than the deterioration of the liquid repellent film 338, it is considered that the replacement time of the print head 30 is not early based on a fact that there is a high possibility that the state of the surface of the nozzle plate NP is restored by executing maintenance. When machine learning is performed in consideration of such circumstances, the learned model 212 can be generated with higher accuracy.

By doing so, machine learning can be performed based on the data in which the state of the surface of the nozzle plate NP is more accurately grasped from the viewpoint of deterioration of the liquid repellent film 338, so that the replacement necessity information can be estimated with higher accuracy.

As described above, when the carriage 21 is moved to the retracted position shown in A1 of FIG. 3, the first imaging portion 71 faces the surface of the nozzle plate NP. Therefore, the first imaging portion 71 can image the surface of the nozzle plate NP, so that the nozzle surface image information NI can be acquired. In other words, the nozzle surface image information NI is acquired by the first imaging portion 71 attached to a position facing the nozzle plate surface. By doing so, the nozzle surface image information NI can be acquired inside a mechanism of the printing device 1, so that the input data can be efficiently acquired and the replacement necessity information can be estimated with higher accuracy.

Next, with reference to a flowchart of FIG. 14, a processing example performed by the information processing system 200 will be described, and the inference process in the present embodiment will be described. The inference process of the present embodiment is not limited to the processing example of FIG. 14, and various modifications can be performed. The processing portion 230 of the information processing system 200 determines whether or not it is the predetermined timing (step S101), and, when it is determined to be the predetermined timing (Yes in step S101), the process after step S102 is performed. The predetermined timing is the timing described above in the description with reference to FIG. 12 and FIG. 13, but may also be a timing, at which a sudden problem occurs in the printing device 1 and the print head 30 is confirmed, and can be arbitrarily set by the user. The timing, at which the printing failure such as flight bending occurs while the printing device 1 is experimentally operated, may be set as the predetermined timing.

Next, when the processing portion 230 determines that it is the predetermined timing (Yes in step S101), the reception portion 220 executes a nozzle surface image information reception process (step S102). Specifically, the nozzle surface image information NI, which is a target of the replacement necessity of the print head 30, is received. The nozzle surface image information NI is imaged by the first imaging portion 71 in advance and stored in a predetermined memory. In addition, the predetermined memory is, for example, the storage portion 210, but may be another memory such as a memory (not shown) existing in the first imaging unit 70. In addition, when adding a process of imaging the surface of the nozzle plate NP by the first imaging portion 71 to the process in step S102, the nozzle surface image information NI may be received in real time.

Next, the processing portion 230 executes the inference process (step S103) based on the learned model 212. Specifically, the processing portion 230 performs a process of estimating recommended replacement necessity information based on, for example, the received nozzle surface image information NI and the learned model 212 stored in the storage portion 210. When the neural network shown in FIG. 11 is used, the processes in step S103 includes obtaining five types of probability data respectively representing "immediate replacement of the print head", "replacement of the print head within three days", "replacement of the print head within one week", "replacement of the print head within one month", and "unnecessariness of replacement of the print head", and specifying the maximum value thereof.

Next, the processing portion 230 executes an inference result notification process (S104). Specifically, for example, the processing portion 230 performs a process of displaying the replacement necessity information of the print head 30 on a display portion (not shown) provided in the printing device 1. Although not shown, the replacement necessity information may be displayed on the display portion of an external device that can be connected to the printing device 1. In addition, although not shown, the printing device 1 may be provided with a predetermined light emitting portion to display the replacement necessity information according to a light emitting mode. For example, when it is not necessary to replace the print head 30, a blue lamp may be emitted, or, when it is recommended to replace the print head 30 immediately, a red lamp may be emitted. In addition, the replacement timing of the print head 30 may be notified according to the light emitting mode of the light emitting portion. For example, a notification may be provided in which, when the replacement of the print head 30 after one month is recommended, one yellow lamp is emitted, and, when the replacement of the print head 30 within one week is recommended, three yellow lamps are emitted. By doing so, the replacement timing of the print head 30 can be easily determined.

Figure 15:
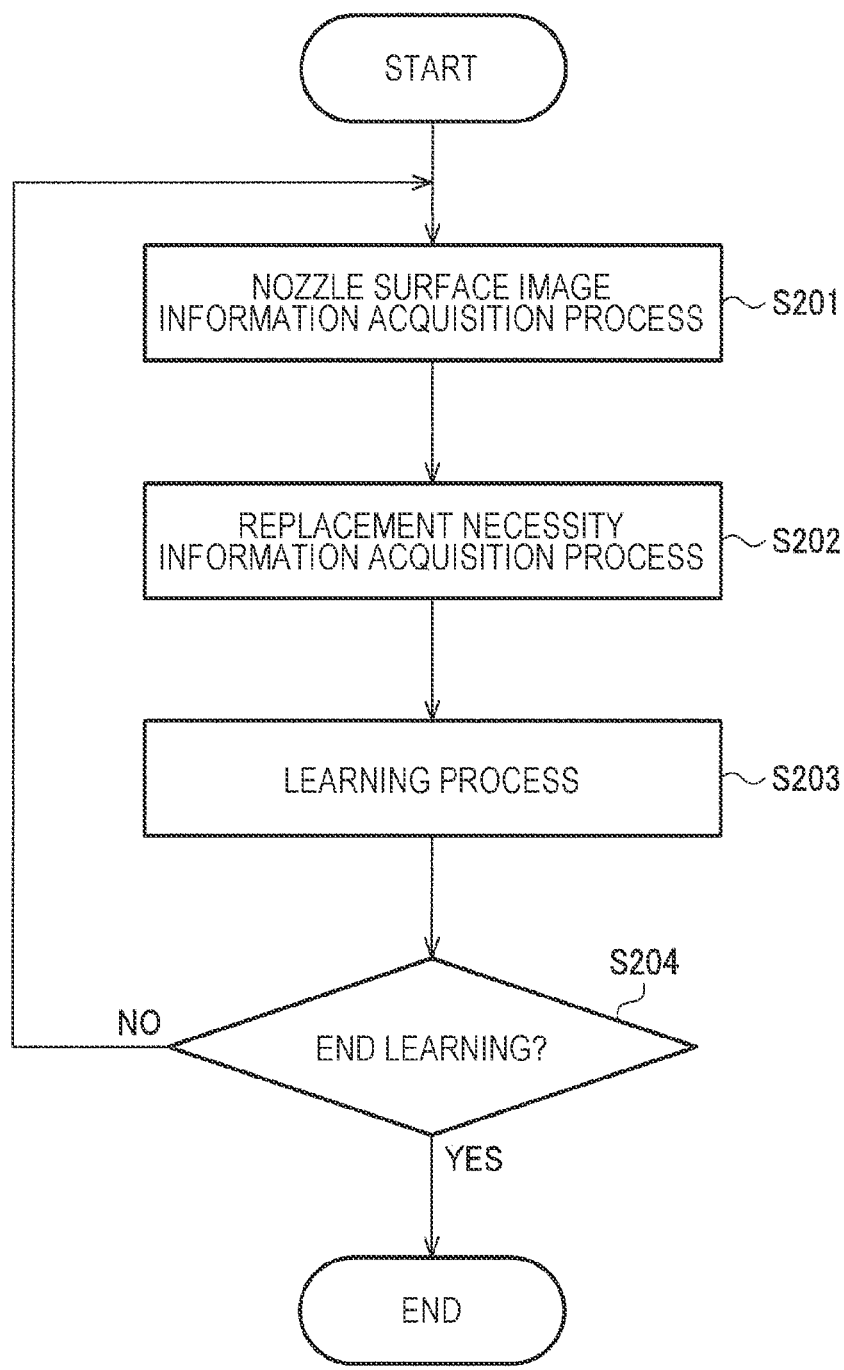
FIG. 15 is a flowchart showing a processing example in the learning device.

Next, a specific processing example performed by the learning device 400 will be described with reference to a flowchart of FIG. 15. When the process is started, the acquisition portion 410 performs a nozzle surface image information acquisition process (step S201) and a replacement necessity information acquisition process (step S202). That is, the acquisition portion 410 acquires one data set in which the nozzle surface image information NI and the replacement necessity information are associated with each other.

Next, the learning portion 420 executes a specific learning process (step S203). The learning portion 420 inputs the nozzle surface image information NI and the replacement necessity information to the neural network, and obtains an output by performing a forward calculation using the weighting coefficient information at that time. The output is, for example, N numerical data whose total is 1 as described above. The learning portion 420 obtains an error function based on the output and the replacement necessity information. The error function is, for example, the sum of absolute difference values between N numerical values that are the outputs and N numerical values that are the replacement necessity information. However, the method for calculating the error function is not limited thereto, and various modifications can be performed. Further, in step S203, the learning portion 420 updates the weighting coefficient information so as to reduce the error function. In the process, the backpropagation method can be applied as described above. Step S201 to step S203 are processes based on one data set.

Next, the learning portion 420 determines whether or not to end the learning process (step S204). In a case of ending the learning process (Yes in step S204), the flow of FIG. 15 ends, the learning device 400 outputs the learned model 212, which is a learning result, to the information processing system 200 by the above-described means, and the learned model 212 is stored in the storage portion 210. The case where the learning process ends includes, for example, a case where the learning portion 420 performs the process based on a predetermined number or more data sets or a case where the correct answer rate based on verification data is a predetermined value or more, the case where the learning process ends may include other cases. In addition, the verification data represents a data set that is a part of the data set collected for machine learning and is not used for a process of updating the weighting coefficient information. Since the verification data is the data associated with the replacement necessity information which is correct answer data, the verification data can be used for verification of whether or not the inference by the neural network is correct.

On the other hand, when the learning process does not end (No in step S204), the learning portion 420 returns to step S201 and continues the process. Specifically, the acquisition portion 410 reads a next data set, and the learning portion 420 updates the weighting coefficient information using the data set. FIG. 15 is an example of a flow of the learning process, and a specific process is not limited thereto. For example, methods, such as batch learning and mini-batch learning, are known in the machine learning, and the methods can be widely applied in the present embodiment.

As a specific method for updating the learned model 212, for example, when the print head 30 is replaced according to the replacement necessity information output through the inference process, the surface of the nozzle plate NP is confirmed. Further, when the deterioration of the surface of the nozzle plate NP cannot be confirmed to the extent of estimation, the learned model 212 is updated so as to prolong the period until replacement. Similarly, when it can be confirmed that printing failure frequently occurs earlier than the replacement necessity information output through the inference process and the deterioration of the surface of the nozzle plate NP is progressed more than expected, the learned model 212 is updated to shorten the period until replacement. In addition, although the above-described processing example is the processing example performed by the learning device 400 of FIG. 7, the processing example may be performed by the printing device 1 shown in FIG. 8. In addition, the learned model 212 updated by the printing device 1 of FIG. 8 may be installed in a newly installed printing device 1. For example, although the learned model 212 can be installed by connecting the printing devices 1 to each other via a network, the learned model 212 may be installed via a predetermined storage medium. By doing so, the latest learned model 212 can be used at a time point in which a new printing device 1 of the same model is installed, so that an appropriate inference result can be obtained.

2. Modification Example

In the above description, although machine learning based on the data set in which the nozzle surface image information NI and the replacement necessity information are associated with each other is described, the method of the present embodiment is not limited thereto and various modifications can be performed. For example, machine learning may be performed based on the above-described data set in which the nozzle surface image information NI and the discharge result information are used as the input data. Here, the discharge result information is image data obtained by imaging the test pattern PT described above in FIG. 3 by the second imaging portion 81, and, as described above, the amount of deviation of an ink discharge position can be grasped from the discharge result information. That is, when the learning portion 420 generates the learned model 212 based on machine learning in which the nozzle surface image information NI and the discharge result information are used as the input data and the replacement necessity information is used as the correct answer data, machine learning in which the discharge result information is considered can be realized. In other words, the learned model 212 is machine-learned based on a data set in which the nozzle surface image information NI, the replacement necessity information, and the discharge result information including the amount of deviation of the ink discharge position are associated with each other.

By doing so, machine learning can be performed in consideration of the relationship between the amount of remaining ink on the surface of the nozzle plate NP and the amount of deviation of the ink in the intermediate layer of the neural network. Alternatively, machine learning can be performed in consideration of the relationship between the deterioration state of the liquid repellent film 338 and the amount of deviation of the ink in the intermediate layer of the neural network. As a result, the replacement necessity information can be estimated with higher accuracy.

In addition, as described above in FIG. 3, the discharge result information can be acquired by imaging the test pattern PT by the second imaging portion 81 provided in the printing device 1. In other words, the discharge result information is acquired by the second imaging portion 81 provided in the printing device 1. By doing so, the printing device 1 can efficiently acquire the discharge result information, so that the data set necessary for machine learning can be efficiently acquired and the replacement necessity information can be estimated with higher accuracy.

In addition, as described above in FIG. 3, the second imaging unit 80 including the second imaging portion 81 is mounted on the carriage 21. In other words, the second imaging portion is attached to the carriage on which the print head 30 is mounted. By doing so, imaging can be effectively performed by the second imaging portion 81 as described above, so that the data set necessary for machine learning can be more efficiently acquired and the replacement necessity information can be estimated with higher accuracy.

In addition, although the details will be described later, in addition to the nozzle surface image information NI, the maintenance information may be further included as the input data of the data set related to machine learning. In other words, the learned model 212 may be obtained by performing machine learning based on a data set in which the nozzle surface image information NI, the replacement necessity information, and maintenance history information are associated with each other. By doing so, when machine learning is performed in consideration of the maintenance history, the replacement necessity information can be estimated with higher accuracy. Alternatively, although the details will be described later, in addition to the nozzle surface image information NI, ink information may be further included as the input data of the data set related to machine learning. In other words, the learned model 212 may be obtained by performing machine learning based on a data set in which the nozzle surface image information NI, the replacement necessity information, and ink information are associated with each other. By doing so, when machine learning is performed in consideration of the ink information, the replacement necessity information can be estimated with higher accuracy.

Figure 14:
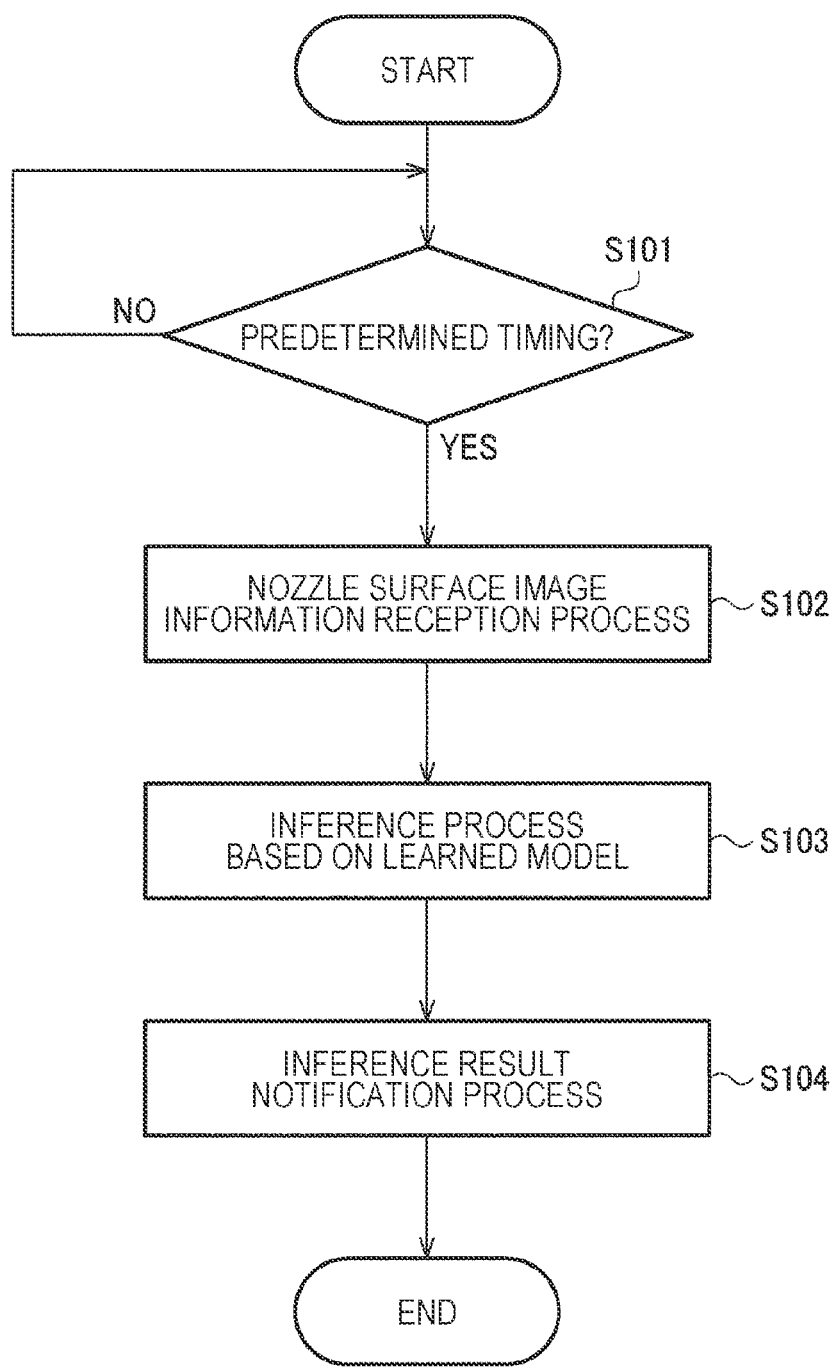
FIG. 14 is a flowchart showing a processing example in the information processing system.
Figure 16:
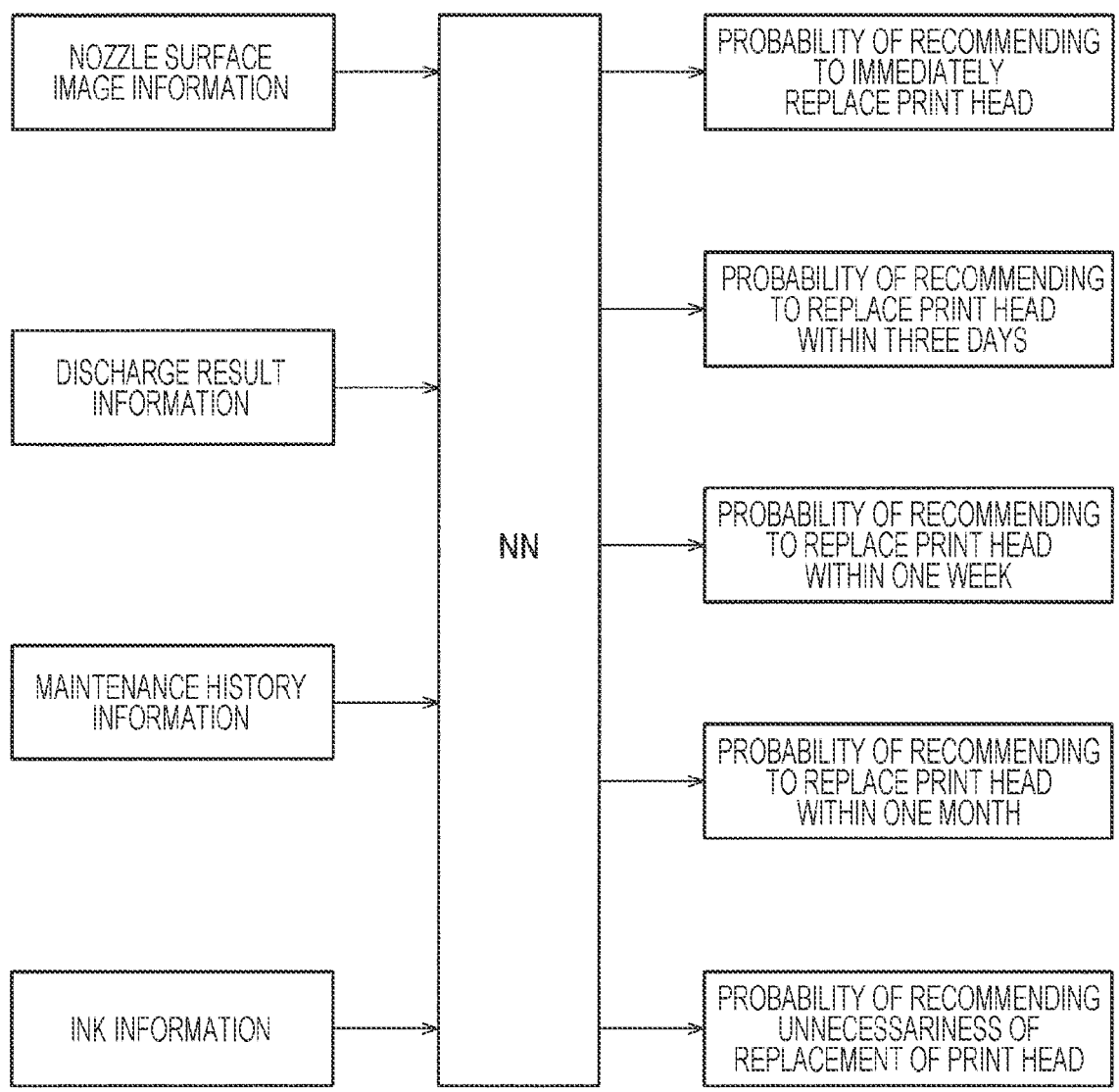
FIG. 16 is a diagram showing details of maintenance information and ink information.

In addition, in the above description, data that can be added to the nozzle surface image information NI, which is the input data of FIG. 14, are listed one by one, but the data may be arbitrarily combined and added, and, for example, as shown in FIG. 16, all the data may be combined and added.

The maintenance history information is, for example, replacement history information of the print head 30, but may be wiping history information of the nozzle surface of the print head 30, recovery cleaning history information, or may be information obtained by arbitrarily combining the pieces of information, and, further, as shown in FIG. 17, may be information obtained by combining all the pieces of information. In other words, the maintenance history information of the print head 30 includes any one of the replacement history information of the print head 30, the wiping history information of the nozzle surface of the print head 30, and the recovery cleaning history information. In addition, the wiping history information is, for example, information related to the number of times that wiping is performed, but is not limited thereto, and may be, for example, information related to wiping strength, information in which the pieces of information are arbitrarily combined, and, further, as shown in FIG. 17, information including all the pieces of information. In other words, the wiping history information includes information related to either the number of times that wiping is performed or wiping strength. The information related to the wiping strength includes, for example, information of a set load for the wiper, information of a set speed, and the like. In addition, the wiping history information may include information of a material of the wiper. The material of the wiper includes, for example, rubber, elastomer, cloth, or the like.

In addition, the recovery cleaning history information includes information of the execution interval of recovery cleaning, but may further include an environmental condition in recovery cleaning. The reason for this is that the environmental condition influences the viscosity of the ink. The environmental condition is, for example, temperature, but may include humidity.

In addition, the ink information is, for example, ink composition information, but may be ink viscosity information, and, further, as shown in FIG. 17, the ink information may be information obtained by combining the pieces of information. In other words, the ink information includes information related to either the ink composition information or ink viscosity information.

For example, it is considered that each nozzle surface image information NI, which is acquired when the period until the replacement of the print head 30 is short, has a feature that is not shown from each nozzle surface image information NI acquired when the period until replacement of the print head 30 is long, so that the period until the print head 30 is replaced is shortened due to the feature. Therefore, when the replacement history information of the print head 30 is used, machine learning can be performed in consideration of a more detailed part of the nozzle surface image information NI, so that the replacement necessity information can be estimated with higher accuracy.

In addition, for example, in the case of an aspect in which wiping is performed repeatedly with the same wiper, there is a case where ink adheres to the wiper due to the wiping at the time of the previous maintenance, and the adhered ink remains on a wiper surface. Therefore, the ink adhering to the wiper surface in the re-wiping influences the liquid repellent film 338. In this way, when the wiping history information is used, machine learning can be performed in consideration of a more detailed part of the nozzle surface image information NI, so that the replacement necessity information can be estimated with higher accuracy. In addition, the degree of the influence given to the liquid repellent film 338 depends on the number of times that wiping is performed and the wiping strength. In this way, when the information related to either the number of times that wiping is performed or the wiping strength, machine learning can be performed in consideration of a more detailed part of the nozzle surface image information NI, so that the replacement necessity information can be estimated with higher accuracy.

In addition, the viscosity of the ink, which remains on the surface of the nozzle plate NP without being completely removed after the recovery cleaning is performed, becomes high with the passage of time. Further, when the ink whose viscosity becomes high is wiped in the recovery cleaning again, the liquid repellent film 338 is influenced. In this way, when the recovery cleaning history information is used, machine learning can be performed in consideration of a more detailed part of the nozzle surface image information NI, so that the replacement necessity information can be estimated with higher accuracy. In addition, the degree of the influence given to the liquid repellent film 338 depends on the elapsed time, that is, the execution interval of the recovery cleaning. In this way, when the information of the execution interval of the recovery cleaning is used, machine learning can be performed in consideration of the more detailed part of the nozzle surface image information NI, so that the replacement necessity information can be estimated with higher accuracy.

In addition, the influence given to the liquid repellent film 338 differs depending on the ink type. For example, the liquid repellent film 338 is more easily scraped when a pigment-based ink is wiped than when a dye-based ink is wiped. In addition, when a black ink containing particles consisting of carbon black or a white ink containing particles consisting of titanium oxide is wiped, the liquid repellent film 338 is easily scraped because the particles are hard. In addition, when the surface of the nozzle plate NP of the print head 30 using the inks in a single color is wiped, the liquid repellent film 338 on an end side of the nozzle plate NP is easily scraped. On the other hand, when the surface of the nozzle plate NP of the print head 30 using a full-color ink is wiped, the liquid repellent film 338 is uniformly scraped in the surface of the nozzle plate NP. The fact that the liquid repellent film 338 on the end side of the nozzle plate NP is easily scraped means that the liquid repellent film 338 at an edge of the nozzle NZ is easily scraped, so that flight bending is likely to occur as described above. The ink viscosity is as described above in the description of the recovery cleaning information.

In this way, when the ink type information and the ink viscosity information are used, machine learning can be performed in consideration of a more detailed part of the nozzle surface image information NI, so that the replacement necessity information can be estimated with higher accuracy.

As described above, the information processing system of the present embodiment includes a storage portion, a reception portion, and a processing portion. In addition, the storage portion stores a learned model that is obtained by performing machine learning on a replacement condition for a print head based on a data set in which nozzle surface image information obtained by photographing a nozzle surface of the print head and replacement necessity information representing replacement necessity of the print head or a replacement timing of the print head are associated with each other. In addition, the reception portion receives the nozzle surface image information. In addition, the processing portion outputs the replacement necessity information of the print head based on the received nozzle surface image information and the learned model.

By doing so, transition of a deterioration situation of a liquid repellent film of a nozzle plate can be appropriately grasped. Therefore, the expensive head unit can be replaced at an appropriate timing. As a result, a maintenance plan can be optimized, so that maintenance costs can be reduced and an operating rate of a printing device can be increased.

In addition, the nozzle surface image information may be an image obtained by photographing a nozzle plate surface of the print head.

By doing so, a state of a surface of the nozzle plate can be acquired in the form of imaging data, so that machine learning can be performed on the state of the surface of the nozzle plate.

In addition, the processing portion may determine the amount of remaining ink on the nozzle plate surface based on the nozzle surface image information, and outputs the replacement necessity information based on the amount of remaining ink and the learned model.

By doing so, machine learning can be performed based on data in which the state of the surface of the nozzle plate is more quantified, so that the learned model can be learned more appropriately.

In addition, the processing portion may determine the amount of scraped liquid repellent film on the nozzle plate surface based on the nozzle surface image information, and may output the replacement necessity information based on the amount of scraped liquid repellent film and the learned model.

By doing so, machine learning can be performed based on the data in which the state of the surface of the nozzle plate is more quantified, so that the learned model can be learned more appropriately and appropriate information can be obtained regarding replacement time, a replacement timing, or the like of the print head.

In addition, the nozzle surface image information may be acquired by a first imaging portion attached to a position facing a nozzle plate surface.

By doing so, the nozzle surface image information can be acquired inside a mechanism of the printing device, so that the input data can be efficiently acquired and appropriate information can be obtained regarding replacement time, a replacement timing, or the like of the print head.

In addition, the learned model may be obtained by performing machine learning based on a data set in which the nozzle surface image information, the replacement necessity information, and discharge result information including the amount of deviation of an ink discharge position are associated with each other.

By doing so, learning can be performed by correlating a deterioration state of the liquid repellent film on the surface of the nozzle plate with the amount of deviation of ink in an intermediate layer of a neural network, so that more appropriate machine learning can be performed.

In addition, the discharge result information may be acquired by a second imaging portion provided in the printing device.

By doing so, the discharge result information can be efficiently acquired by the printing device, so that the data set necessary for machine learning can be efficiently acquired and more appropriate machine learning can be performed.

In addition, the second imaging portion may be attached to a carriage on which the print head is mounted.

By doing so, the imaging by the second imaging portion can be performed efficiently, so that the data set necessary for machine learning can be acquired more efficiently and more appropriate machine learning can be performed.

In addition, the learned model may be obtained by performing machine learning based on a data set in which the nozzle surface image information, the replacement necessity information, and maintenance history information are associated with each other.

By doing so, when machine learning is performed in consideration of the maintenance history, the replacement necessity information can be estimated with higher accuracy.

In addition, the maintenance history information may include information related to any one of replacement history information of the print head, wiping history information of a nozzle surface of the print head, and recovery cleaning history information.

By doing so, when machine learning is performed in consideration of any of the replacement history information of the print head, the wiping history information of the nozzle surface of the print head, and the recovery cleaning history information, the replacement necessity information can be estimated with higher accuracy.

In addition, the wiping history information may include information related to either the number of times that wiping is performed or wiping strength.

By doing so, when machine learning is performed in consideration of information related to either the number of times that wiping is performed or the wiping strength, the replacement necessity information can be estimated with higher accuracy.

In addition, the recovery cleaning history information may include information of an execution interval of recovery cleaning.

By doing so, when machine learning is performed in consideration of the execution interval of recovery cleaning, the replacement necessity information can be estimated with higher accuracy.

In addition, the learned model may be obtained by performing machine learning based on a data set in which the nozzle surface image information, the replacement necessity information, and ink information are associated with each other.

By doing so, when machine learning is performed in consideration of the ink information, the replacement necessity information can be estimated with higher accuracy.

In addition, the ink information may include information related to either ink composition information or ink viscosity information.

By doing so, when machine learning is performed in consideration of information related to either the ink composition information or the ink viscosity information, the replacement necessity information can be estimated with higher accuracy.

In addition, an information processing method of the present embodiment includes storing a learned model, receiving nozzle surface image information, and outputting replacement necessity information of a print head based on the received nozzle surface image information and the learned model. In addition, the learned model is obtained by performing machine learning on a replacement condition for the print head based on a data set in which the nozzle surface image information obtained by photographing a nozzle surface of the print head and the replacement necessity information representing replacement necessity of the print head or a replacement timing of the print head are associated with each other.

By doing so, transition of a deterioration situation of a liquid repellent film of a nozzle plate can be appropriately grasped. Therefore, the expensive head unit can be replaced at an appropriate timing. As a result, a maintenance plan can be optimized, so that maintenance costs can be reduced and an operating rate of a printing device can be increased.

In addition, a learning device of the present embodiment includes an acquisition portion that acquires a data set in which nozzle surface image information obtained by photographing a nozzle surface of a print head and replacement necessity information representing replacement necessity of the print head or a replacement timing of the print head are associated with each other; and a learning portion that performs machine learning on the replacement necessity of the print head based on the acquired data set.

By doing so, it is possible to output the learned model that appropriately grasps the transition of the deterioration situation of the liquid repellent film of the nozzle plate.

Although the present embodiment is described in detail as described above, those skilled in the art can easily understand that many modifications that do not substantially deviate from new matters and effects of the present disclosure are possible. Therefore, all such modification examples are included in the scope of the present disclosure. For example, a term, which is described at least once in a specification or a drawing together with a different term in a broader or synonymous manner, can be replaced by the different term anywhere in the specification or the drawing. In addition, all combinations of the present embodiment and modification examples are also included in the scope of the present disclosure. In addition, the configuration and operation of the information processing system, the information processing method, the learning device, and the like are not limited to those described in the present embodiment, and various modifications can be performed.

What is claimed is:

1. An information processing system comprising:
a storage portion that stores a learned model that is obtained by performing machine learning on a replacement condition for a print head based on a data set in which nozzle surface image information obtained by photographing a nozzle surface of the print head and replacement necessity information representing replacement necessity of the print head or a replacement timing of the print head that are associated with each other;
a reception portion that receives the nozzle surface image information; and
a processing portion that outputs the replacement necessity information of the print head based on the received nozzle surface image information and the learned model,
wherein the nozzle surface image information is acquired by a first imaging portion attached to a position facing a nozzle plate surface.

2. The information processing system according to claim 1, wherein the processing portion determines an amount of remaining ink on the nozzle plate surface based on the nozzle surface image information, and outputs the replacement necessity information based on the amount of remaining ink and the learned model.

3. The information processing system according to claim 1, wherein the processing portion determines an amount of scraped liquid repellent film on the nozzle plate surface based on the nozzle surface image information, and outputs the replacement necessity information based on the amount of scraped liquid repellent film and the learned model.

4. The information processing system according to claim 1, wherein the learned model is machine-learned based on a data set in which discharge result information including an amount of deviation of an ink discharge position is further associated with the nozzle surface image information and the replacement necessity information.

5. The information processing system according to claim 3, wherein the discharge result information is acquired by a second imaging portion provided in a printing device.

6. The information processing system according to claim 5, wherein the second imaging portion is attached to a carriage on which the print head is mounted.

7. The information processing system according to claim 1, wherein the learned model is machine-learned based on a data set in which maintenance history information is further associated with the nozzle surface image information and the replacement necessity information.

8. The information processing system according to claim 7, wherein the maintenance history information includes information related to any one of replacement history information of the print head, wiping history information of the nozzle surface of the print head, and recovery cleaning history information.

9. The information processing system according to claim 8, wherein the wiping history information includes information related to either the number of times that wiping is performed or wiping strength.

10. The information processing system according to claim 8, wherein the recovery cleaning history information includes information of an execution interval of recovery cleaning.

11. The information processing system according to claim 1, wherein the learned model is machine-learned based on a data set in which ink information is further associated with the nozzle surface image information and the replacement necessity information.

12. The information processing system according to claim 11, wherein the ink information includes information related to either ink composition information or ink viscosity information.

13. An information processing method comprising:
storing a learned model that is obtained by performing machine learning on a replacement condition for a print head based on a data set in which nozzle surface image information obtained by photographing a nozzle surface of the print head and replacement necessity information representing replacement necessity of the print head or a replacement timing of the print head that are associated with each other;
receiving the nozzle surface image information; and
outputting the replacement necessity information of the print head based on the received nozzle surface image information and the learned model,
wherein the nozzle surface image information is acquired by a first imaging portion attached to a position facing a nozzle plate surface of the print head.

14. A learning device comprising:
an acquisition portion that acquires a data set in which nozzle surface image information obtained by photographing a nozzle surface of a print head and replacement necessity information representing replacement necessity of the print head or a replacement timing of the print head are associated with each other; and
a learning portion that performs machine learning on the replacement necessity of the print head based on the acquired data set,
wherein the nozzle surface image information is acquired by a first imaging portion attached to a position facing a nozzle plate surface.

15. An information processing system comprising:
a storage portion that stores a learned model that is obtained by performing machine learning on a replacement condition for a print head based on a data set in which nozzle surface image information obtained by photographing a nozzle surface of the print head, replacement necessity information representing replacement necessity of the print head or a replacement timing of the print head, and discharge result information including an amount of deviation of an ink discharge position that are associated with each other;
a reception portion that receives the nozzle surface image information; and
a processing portion that outputs the replacement necessity information of the print head based on the received nozzle surface image information and the learned model.

* * * * *